US010097985B2

(12) United States Patent
He et al.

(10) Patent No.: US 10,097,985 B2
(45) Date of Patent: Oct. 9, 2018

(54) INTER-USER EQUIPMENT DISCOVERY METHOD, APPARATUS, AND SYSTEM

(71) Applicant: Huawei Technologies Co., Ltd., Shenzhen (CN)

(72) Inventors: Yue He, Beijing (CN); Hui Jin, Beijing (CN); Qiang Yi, Beijing (CN); Guowei Ouyang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/816,782

(22) Filed: Nov. 17, 2017

(65) Prior Publication Data
US 2018/0098209 A1 Apr. 5, 2018

Related U.S. Application Data

(63) Continuation of application No. PCT/CN2015/079193, filed on May 18, 2015.

(51) Int. Cl.
*H04W 74/00* (2009.01)
*H04W 8/00* (2009.01)
(Continued)

(52) U.S. Cl.
CPC ........... *H04W 8/005* (2013.01); *H04W 48/10* (2013.01); *H04W 48/16* (2013.01);
(Continued)

(58) Field of Classification Search
CPC ..... H04W 88/06; H04W 12/06; H04W 12/12; H04W 76/16; H04W 12/08; H04W 88/04;
(Continued)

(56) References Cited

U.S. PATENT DOCUMENTS

| 2004/0008138 A1* | 1/2004 | Hockley, Jr. .......... G01S 5/0072 342/357.48 |
| 2011/0228666 A1* | 9/2011 | Barbieri ................ H04W 76/14 370/216 |

(Continued)

FOREIGN PATENT DOCUMENTS

WO 2014197851 A1 12/2014

OTHER PUBLICATIONS

"3rd Generation Partnership Project;Technical Specification Group Services and System Aspects;Study on Extended Architecture Support for Proximity-Based Services (Release 13)", 3GPP TR 23.713, vol. 1.3.0, May 2015, pp. 1-69.

(Continued)

*Primary Examiner* — Nimesh Patel
(74) *Attorney, Agent, or Firm* — Slater Matsil, LLP

(57) ABSTRACT

An inter-user equipment discovery method, apparatus and system are disclosed. In an embodiment, the method includes sending, by first user equipment, a discovery request message to a first proximity-based service entity, wherein the discovery request message comprises initial location information of the first user equipment and receiving a discovery response message sent by the first proximity-based service entity, wherein the discovery response message comprises a first code word of the first user equipment. The method further include generating a discovery message according to location offset information and the first code word, wherein the location offset information is an offset between a current location and an initial location of the first user equipment and broadcasting the discovery message, wherein the discovery message is used by a second user equipment to determine a location of the first user equipment.

7 Claims, 14 Drawing Sheets

(51) Int. Cl.
*H04W 48/10* (2009.01)
*H04W 64/00* (2009.01)
*H04W 48/16* (2009.01)
*H04W 48/14* (2009.01)
*H04W 4/02* (2018.01)
*H04W 76/14* (2018.01)

(52) U.S. Cl.
CPC .......... *H04W 64/006* (2013.01); *H04W 4/023* (2013.01); *H04W 48/14* (2013.01); *H04W 76/14* (2018.02)

(58) Field of Classification Search
CPC ....... H04W 8/22; H04W 48/04; H04W 68/12; H04W 8/205; H04W 12/00; H04W 1/667; H04W 1/66; H04W 1/72519; H04W 1/663; H04W 1/72547; H04W 16/14; H04W 48/16; H04W 84/18; H04W 24/00; H04W 4/02; H04W 24/02; H04W 4/008; H04W 4/023; H04W 64/00; H04W 72/04; H04W 72/0453; H04W 72/12; H04W 88/08; H04W 72/082; H04W 8/005; H04W 76/14; H04W 84/12; H04W 92/18; H04W 4/80; H04W 4/08; H04W 4/70; H04W 76/10; H04W 12/04
See application file for complete search history.

(56) References Cited

U.S. PATENT DOCUMENTS

| | | | |
|---|---|---|---|
| 2011/0258327 A1* | 10/2011 | Phan | H04W 76/14 709/227 |
| 2014/0248901 A1 | 9/2014 | Johnsson et al. | |
| 2014/0341132 A1 | 11/2014 | Kim et al. | |
| 2014/0341176 A1 | 11/2014 | Chu | |
| 2015/0133133 A1* | 5/2015 | Isobe | H04W 76/14 455/450 |

OTHER PUBLICATIONS

"3rd Generation Partnership Project;Technical Specification Group Services and System Aspects;Universal Geographical Area Description (GAD) (Release 12)", 3GPP TS 23.032, vol. 12.0.0, Sep. 2014, pp. 1-29.

Huawei et al.,"Physical Layer Options for D2D Discovery", 3GPP TSG RAN WG1 Meeting #73, R1-131864, May 20-24, 2013, 8 pages, Fukuoka, Japan.

OTD, "Comments and Questions on S2-140577" SA WG2 Meeting #101bis, S2-140699, San Jose Del Cabo, Mexico, Feb. 17-21, 2014, XP050770256, 39 pages.

* cited by examiner

INTER-USER EQUIPMENT DISCOVERY METHOD, APPARATUS, AND SYSTEM

CROSS-REFERENCE TO RELATED APPLICATIONS

This application is a continuation of International Application No. PCT/CN2015/079193, filed on May 18, 2015, the disclosure of which is hereby incorporated by reference in its entirety.

TECHNICAL FIELD

The present disclosure relates to the field of communications technologies, and in particular, to an inter-user equipment discovery method, an apparatus, and a system.

BACKGROUND

In a conventional mobile network, data communication between user equipments (UE) needs to be implemented by using a core network. Even if two UEs are very close, data between the two UEs still needs to be transmitted by using a core network. In this case, a relatively great network transmission bandwidth is required, and transmission efficiency is relatively low.

To enable UEs that are relatively close to directly transmit data to each other without using a core network, the user equipments need to be capable of discovering each other. That is, user equipment needs to be capable of accurately estimating a distance to another user equipment.

The existing 3rd Generation Partnership Project (3GPP) provides the following technical solution for mutual discovery between user equipments.

First user equipment generates a broadcast code word, and broadcasts the broadcast code word, where the broadcast code word includes location information of the first user equipment, and the location information may be Global Positioning System (GPS) coordinates. Second user equipment receives and parses the broadcast code word to obtain the location information of the first user equipment, and performs distance estimation according to location information of the second user equipment.

In the foregoing solution, the first user equipment broadcasts the broadcast code word that includes the location information. This results in that the location information of the first user equipment is long exposed in an air interface, and may cause user privacy leakage.

SUMMARY

Embodiments of the present disclosure provide an inter-user equipment discovery method, an apparatus, and a system, so as to resolve a prior-art problem of possible privacy leakage when user equipments discover each other.

Embodiments of the present disclosure provide the following technical solutions:

According to a first aspect, an inter-user equipment discovery method is provided, including: sending, by first user equipment, a discovery request message to a first proximity-based service entity, where the discovery request message includes initial location information of the first user equipment, receiving a discovery response message sent by the first proximity-based service entity, where the discovery response message includes a first code word of the first user equipment, obtaining location offset information of the first user equipment, and generating a discovery message according to the location offset information and the first code word, where the location offset information is an offset between a current location and an initial location of the first user equipment and broadcasting the discovery message, where the discovery message is used by the second user equipment or a second proximity-based service entity to which the second user equipment belongs to determine a location of the first user equipment according to the initial location information and the location offset information after obtaining the initial location information and the location offset information.

With reference to the first aspect, in a first possible implementation manner, the method further includes if the offset between the current location and the initial location of the first user equipment is greater than a preset maximum offset, sending current location information of the first user equipment to the first proximity-based service entity, so that the first proximity-based service entity updates the initial location information by using the current location information of the first user equipment.

According to a second aspect, another inter-user equipment discovery method is provided, including obtaining, by second user equipment, a discovery message broadcast by first user equipment, where the discovery message includes location offset information of the first user equipment, and the location offset information is an offset between a current location and an initial location of the first user equipment, sending a match report message to a second proximity-based service entity to which the second user equipment belongs, where the match report message includes the discovery message and receiving initial location information of the first user equipment that is sent by the second proximity-based service entity, and determining a location of the first user equipment according to the initial location information and the location offset information; or receiving positioning information sent by the second proximity-based service entity, where the positioning information is used to indicate a location of the first user equipment, and the positioning information is obtained by the second proximity-based service entity according to the initial location information and the match report message.

With reference to the second aspect, in a first possible implementation manner, the positioning information includes location information of the first user equipment that is obtained by the first proximity-based service entity according to the initial location information and the location offset information.

With reference to the second aspect or the first possible implementation manner of the second aspect, in a second possible implementation manner, the match report message further includes location information of the second user equipment, where the positioning information includes distance information between the first user equipment and the second user equipment that is obtained by the first proximity-based service entity according to the location of the first user equipment and a location of the second user equipment after determining the location of the first user equipment.

According to a third aspect, still another inter-user equipment discovery method is provided, including receiving, by a first proximity-based service entity, a discovery request message sent by first user equipment, where the discovery request message includes initial location information of the first user equipment, receiving a match report message sent by second user equipment, where the match report message includes a discovery message that is broadcast by the first user equipment, that is obtained by the second user equipment, and that includes location offset information of the first user equipment, where both the first user equipment and the second user equipment belong to the first proximity-based service entity; and sending the initial location information to the second user equipment, so that the second user equipment determines a location of the first user equipment according to the initial location information and the location offset information; or obtaining positioning information according to the initial location information and the match report message, and sending the positioning information to the second user equipment, where the positioning information is used to indicate a location of the first user equipment.

With reference to the third aspect, in a first possible implementation manner, the obtaining positioning information according to the initial location information and the match report message includes determining the location of the first user equipment according to the initial location information and the location offset information, where the positioning information includes location information of the first user equipment.

With reference to the third aspect or the first possible implementation manner of the third aspect, in a second possible implementation manner, the match report message further includes location information of the second user equipment, and the obtaining positioning information according to the initial location information and the match report message includes determining the location of the first user equipment according to the initial location information and the location offset information and determining a distance between the first user equipment and the second user equipment according to the location of the first user equipment and a location of the second user equipment, where the positioning information includes distance information between the first user equipment and the second user equipment.

According to a fourth aspect, still another inter-user equipment discovery method is provided, including obtaining, by first user equipment, a first code word and a filter that corresponds to a second code word from a first proximity-based service entity to which the first user equipment belongs, broadcasting, by the first user equipment, the first code word and obtaining, by using the filter, the second code word that is broadcast by second user equipment after receiving the first code word, and broadcasting location information of the first user equipment according to the second code word within a preset time period.

With reference to the fourth aspect, in a first possible implementation manner, the obtaining, by first user equipment, a first code word and a filter that corresponds to a second code word from a first proximity-based service entity to which the first user equipment belongs includes sending a first discovery request message to the first proximity-based service entity, where the first discovery request message includes first indication information, and the first indication information is used to instruct the first proximity-based service entity to configure the second code word and the filter that corresponds to the second code word and receiving a first discovery response message sent by the first proximity-based service entity, where the first discovery response message includes the first code word and the filter.

According to a fifth aspect, still another inter-user equipment discovery method is provided, including receiving, by second user equipment, a first code word broadcast by first user equipment, broadcasting a second code word after the first code word is received, where the second code word is obtained by the second user equipment from a second proximity-based service entity to which the second user equipment belongs and receiving location information of the first user equipment that is broadcast by the first user equipment within a preset time period after receiving the second code word by using a filter, where the filter uniquely corresponds to the second code word.

With reference to the fifth aspect, in a first possible implementation manner, before the broadcasting a second code word, the method further includes sending a second discovery request message to the second proximity-based service entity, where the second discovery request message includes second indication information, and the second indication information is used to request the second code word from the second proximity-based service entity and receiving a second discovery response message sent by the second proximity-based service entity, where the second discovery response message includes the second code word.

According to a sixth aspect, still another inter-user equipment discovery method is provided, including receiving, by a first proximity-based service entity, a first discovery request message sent by first user equipment, where the first discovery request message includes first indication information, configuring, according to the first indication information, a second code word and a filter that corresponds to the second code word, sending a first code word and the filter to the first user equipment and receiving a second discovery request message sent by the second user equipment, where the second discovery request message includes second indication information, and sending the second code word to the second user equipment according to the second indication information, so that the first user equipment broadcasts location information of the first user equipment within a preset time period after receiving, according to the filter, the second code word broadcast by the second user equipment.

According to a seventh aspect, user equipment is provided, including a sending unit, configured to send a discovery request message to a first proximity-based service entity, where the discovery request message includes initial location information of the user equipment, a receiving unit, configured to receive a discovery response message sent by the first proximity-based service entity, where the discovery response message includes a first code word of the user equipment, an obtaining unit, configured to obtain location offset information of the user equipment, a generation unit, configured to generate a discovery message according to the location offset information and the first code word, where the location offset information is an offset between a current location and an initial location of the user equipment and a broadcast unit, configured to broadcast the discovery message, where the discovery message is used by the second user equipment or a second proximity-based service entity to which the second user equipment belongs to determine a location of the user equipment according to the initial location information and the location offset information after obtaining the initial location information and the location offset information.

With reference to the seventh aspect, in a first possible implementation manner, the sending unit is further configured to when the offset between the current location and the initial location of the user equipment is greater than a preset maximum offset, send current location information of the user equipment to the first proximity-based service entity, so that the first proximity-based service entity updates the initial location information by using the current location information of the user equipment.

According to an eighth aspect, another user equipment is provided, including a first receiving unit, configured to obtain a discovery message broadcast by first user equipment, where the discovery message includes location offset information of the first user equipment, and the location offset information is an offset between a current location and an initial location of the first user equipment, a sending unit, configured to send a match report message to a second proximity-based service entity to which the user equipment belongs, where the match report message includes the discovery message and a second receiving unit, configured to receive positioning information sent by the second proximity-based service entity, where the positioning information is used to indicate a location of the first user equipment, and the positioning information is obtained by the second proximity-based service entity according to the initial location information and the match report message; or the second receiving unit, configured to receive initial location information of the first user equipment that is sent by the second proximity-based service entity, where the user equipment further includes a determining unit, configured to determine a location of the first user equipment according to the initial location information and the location offset information.

According to a ninth aspect, a proximity-based service entity is provided, including a first receiving unit, configured to receive a discovery request message sent by first user equipment, where the discovery request message includes initial location information of the first user equipment, a second receiving unit, configured to receive a match report message sent by second user equipment, where the match report message includes a discovery message that is broadcast by the first user equipment, that is obtained by the second user equipment, and that includes location offset information of the first user equipment, where both the first user equipment and the second user equipment belong to the proximity-based service entity and a sending unit, configured to send the initial location information to the second user equipment, so that the second user equipment determines a location of the first user equipment according to the initial location information and the location offset information; or the proximity-based service entity further including an obtaining unit, configured to obtain positioning information according to the initial location information and the match report message, and the sending unit, configured to send the positioning information to the second user equipment, where the positioning information is used to indicate a location of the first user equipment.

With reference to the ninth aspect, in a first possible implementation manner, the obtaining unit is specifically configured to determine the location of the first user equipment according to the initial location information and the location offset information, where the positioning information includes location information of the first user equipment.

With reference to the ninth aspect or the first possible implementation manner of the ninth aspect, in a second possible implementation manner, the match report message further includes location information of the second user equipment, and the obtaining unit is specifically configured to determine the location of the first user equipment according to the initial location information and the location offset information and determine a distance between the first user equipment and the second user equipment according to the location of the first user equipment and a location of the second user equipment, where the positioning information includes distance information between the first user equipment and the second user equipment.

According to a tenth aspect, still another user equipment is provided, including an obtaining unit, configured to obtain a first code word and a filter that corresponds to a second code word from a first proximity-based service entity to which the user equipment belongs, a broadcast unit, configured to broadcast the first code word and a receiving unit, configured to obtain, by using the filter, the second code word that is broadcast by second user equipment after receiving the first code word, where the broadcast unit is further configured to broadcast location information of the user equipment according to the second code word within a preset time period.

With reference to the tenth aspect, in a first possible implementation manner, the user equipment further includes a sending unit, configured to send a first discovery request message to the first proximity-based service entity, where the first discovery request message includes first indication information, and the first indication information is used to instruct the first proximity-based service entity to configure the second code word and the filter that corresponds to the second code word, where the obtaining unit is specifically configured to receive a first discovery response message sent by the first proximity-based service entity, where the first discovery response message includes the first code word and the filter.

According to an eleventh aspect, still another user equipment is provided, including: a first receiving unit, configured to receive a first code word broadcast by first user equipment and a broadcast unit, configured to broadcast a second code word after the receiving unit receives the first code word, where the second code word is obtained by the user equipment from a second proximity-based service entity to which the user equipment belongs, where the first receiving unit is further configured to receive location information of the first user equipment that is broadcast by the first user equipment within a preset time period after receiving the second code word by using a filter, where the filter uniquely corresponds to the second code word.

With reference to the eleventh aspect, in a first possible implementation manner, the user equipment further includes a sending unit, configured to send a second discovery request message to the second proximity-based service entity, where the second discovery request message includes second indication information, and the second indication information is used to request the second code word from the second proximity-based service entity and a second receiving unit, configured to receive a second discovery response message sent by the second proximity-based service entity, where the second discovery response message includes the second code word.

According to a twelfth aspect, another proximity-based service entity is provided, including a receiving unit, configured to receive a first discovery request message sent by first user equipment, where the first discovery request message includes first indication information, a configuration unit, adapted to configure, according to the first indication information, a second code word and a filter that corresponds to the second code word, a sending unit, configured to send a first code word and the filter to the first user equipment and a receiving unit, configured to receive a second discovery request message sent by the second user equipment, where the second discovery request message includes second indication information, where the sending unit is further configured to send the second code word to the second user equipment according to the second indication information, so that the first user equipment broadcasts location information of the first user equipment within a preset time period after receiving, according to the filter, the second code word broadcast by the second user equipment.

According to a thirteenth aspect, still another user equipment is provided, including: a processor, a communications interface, a memory, and a communications bus, where the processor, the communications interface, and the memory communicate with each other by using the communications bus, the memory is configured to save program code and the processor invokes the program code saved in the memory to send a discovery request message to a first proximity-based service entity, where the discovery request message includes initial location information of the user equipment, receive a discovery response message sent by the first proximity-based service entity, where the discovery response message includes a first code word of the user equipment, obtain location offset information of the user equipment, and generate a discovery message according to the location offset information and the first code word, where the location offset information is an offset between a current location and an initial location of the user equipment and broadcast the discovery message, where the discovery message is used by the second user equipment or a second proximity-based service entity to which the second user equipment belongs to determine a location of the user equipment according to the initial location information and the location offset information after obtaining the initial location information and the location offset information.

With reference to the thirteenth aspect, in a first possible implementation manner, the processor invokes the program code saved in the memory to further when the offset between the current location and the initial location of the user equipment is greater than a preset maximum offset, send current location information of the user equipment to the first proximity-based service entity, so that the first proximity-based service entity updates the initial location information by using the current location information of the user equipment.

According to a fourteenth aspect, still another user equipment is provided, including: a processor, a communications interface, a memory, and a communications bus, where the processor, the communications interface, and the memory communicate with each other by using the communications bus, the memory is configured to save program code and the processor invokes the program code saved in the memory to obtain a discovery message broadcast by first user equipment, where the discovery message includes location offset information of the first user equipment, and the location offset information is an offset between a current location and an initial location of the first user equipment, send a match report message to a second proximity-based service entity to which the user equipment belongs, where the match report message includes the discovery message and receive initial location information of the first user equipment that is sent by the second proximity-based service entity, and determine a location of the first user equipment according to the initial location information and the location offset information; or receive positioning information sent by the second proximity-based service entity, where the positioning information is used to indicate a location of the first user equipment, and the positioning information is obtained by the second proximity-based service entity according to the initial location information and the match report message.

According to a fifteenth aspect, still another proximity-based service entity is provided, including: a processor, a communications interface, a memory, and a communications bus, where the processor, the communications interface, and the memory communicate with each other by using the communications bus, the memory is configured to save program code; and the processor invokes the program code saved in the memory to receive a discovery request message sent by first user equipment, where the discovery request message includes initial location information of the first user equipment, receive a match report message sent by second user equipment, where the match report message includes a discovery message that is broadcast by the first user equipment, that is obtained by the second user equipment, and that includes location offset information of the first user equipment, where both the first user equipment and the second user equipment belong to the proximity-based service entity and send the initial location information to the second user equipment, so that the second user equipment determines a location of the first user equipment according to the initial location information and the location offset information; or obtain positioning information according to the initial location information and the match report message, and send the positioning information to the second user equipment, where the positioning information is used to indicate a location of the first user equipment.

With reference to the fifteenth aspect, in a first possible implementation manner, the processor invokes the program code saved in the memory to further determine the location of the first user equipment according to the initial location information and the location offset information, where the positioning information includes location information of the first user equipment.

With reference to the fifteenth aspect or the first possible implementation manner of the fifteenth aspect, in a second possible implementation manner, the match report message further includes location information of the second user equipment, and the processor invokes the program code saved in the memory to further determine the location of the first user equipment according to the initial location information and the location offset information and determine a distance between the first user equipment and the second user equipment according to the location of the first user equipment and a location of the second user equipment, where the positioning information includes distance information between the first user equipment and the second user equipment.

According to a sixteenth aspect, still another user equipment is provided, including: a processor, a communications interface, a memory, and a communications bus, where the processor, the communications interface, and the memory communicate with each other by using the communications bus, the memory is configured to save program code and the processor invokes the program code saved in the memory to obtain a first code word and a filter that corresponds to a second code word from a first proximity-based service entity to which the user equipment belongs, broadcast, by the user equipment, the first code word and obtain, by using the filter, the second code word that is broadcast by second user equipment after receiving the first code word, and broadcast location information of the user equipment according to the second code word within a preset time period.

With reference to the sixteenth aspect, in a first possible implementation manner, the processor invokes the program code saved in the memory to further send a first discovery request message to the first proximity-based service entity, where the first discovery request message includes first indication information, and the first indication information is used to instruct the first proximity-based service entity to configure the second code word and the filter that corresponds to the second code word and receive a first discovery response message sent by the first proximity-based service entity, where the first discovery response message includes the first code word and the filter.

According to a seventeenth aspect, still another user equipment is provided, including: a processor, a communications interface, a memory, and a communications bus, where the processor, the communications interface, and the memory communicate with each other by using the communications bus, the memory is configured to save program code and the processor invokes the program code saved in the memory to: receive a first code word broadcast by first user equipment, broadcast a second code word after the first code word is received, where the second code word is obtained by the user equipment from a second proximity-based service entity to which the user equipment belongs and receive location information of the first user equipment that is broadcast by the first user equipment within a preset time period after receiving the second code word by using a filter, where the filter uniquely corresponds to the second code word.

With reference to the seventeenth aspect, in a first possible implementation manner, the processor invokes the program code saved in the memory to further send a second discovery request message to the second proximity-based service entity, where the second discovery request message includes second indication information, and the second indication information is used to request the second code word from the second proximity-based service entity and receive a second discovery response message sent by the second proximity-based service entity, where the second discovery response message includes the second code word.

According to an eighteenth aspect, still another proximity-based service entity is provided, including: a processor, a communications interface, a memory, and a communications bus, where the processor, the communications interface, and the memory communicate with each other by using the communications bus, the memory is configured to save program code and the processor invokes the program code saved in the memory to receive a first discovery request message sent by first user equipment, where the first discovery request message includes first indication information, configure, according to the first indication information, a second code word and a filter that corresponds to the second code word, send a first code word and the filter to the first user equipment and receive a second discovery request message sent by the second user equipment, where the second discovery request message includes second indication information, and send the second code word to the second user equipment according to the second indication information, so that the first user equipment broadcasts location information of the first user equipment within a preset time period after receiving, according to the filter, the second code word broadcast by the second user equipment.

According to a nineteenth aspect, a communications system is provided, including first user equipment, a first proximity-based service entity to which the first user equipment belongs, second user equipment, and a second proximity-based service entity to which the second user equipment belongs, where the first proximity-based service entity is connected to the second proximity-based service entity, the first user equipment is the user equipment according to the seventh aspect, the first possible implementation manner of the seventh aspect, the thirteenth aspect, or the first possible implementation manner of the thirteenth aspect and the second user equipment is the user equipment according to the eighth aspect or the fourteenth aspect.

According to a twentieth aspect, a communications system is provided, including first user equipment, a first proximity-based service entity to which the first user equipment belongs, second user equipment, and a second proximity-based service entity to which the second user equipment belongs, where the first proximity-based service entity is connected to the second proximity-based service entity, the first user equipment is the user equipment according to the tenth aspect, the first possible implementation manner of the tenth aspect, the sixteenth aspect, or the first possible implementation manner of the sixteenth aspect and the first user equipment is the user equipment according to the eleventh aspect, the first possible implementation manner of the eleventh aspect, the seventeenth aspect, or the first possible implementation manner of the seventeenth aspect.

By means of the foregoing solutions, a discovery message broadcast by first user equipment carries location offset information, second user equipment or a second proximity-based service entity to which the second user equipment belongs may determine a location of the first user equipment according to the location offset information and initial location information of the first user equipment, and another user equipment cannot determine the location of the first user equipment only according to the location offset information, preventing the location of the user equipment from being exposed, thereby resolving a problem of user privacy leakage.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions provided in the following embodiments of the present disclosure may be applied to a wireless communications network, for example: a Wideband Code Division Multiple Access (W-CDMA) system, a Time Division-Synchronous Code Division Multiple Access (TD-SCDMA) system, a Long Term Evolution (LTE) system, and a further evolved network system thereof.

The wireless communications network may include user equipment on a user side and a proximity-based service entity on a core network side.

In the embodiments of the present disclosure, the user equipment may be referred to as a terminal, a mobile station, a subscriber unit, a station, or the like. The user equipment may be specifically a wireless communications device such as a cellular phone, a personal digital assistant (PDA), a handheld device, or a laptop computer. Moreover, the user equipment may be distributed in the entire wireless communications network, and each user equipment may be movable.

There may be multiple proximity-based service entities on the core network side, and the proximity-based service entities may communicate with each other. Each proximity-based service entity may be connected to multiple user equipments. In this way, two different user equipments on the user side: first user equipment and second user equipment may belong to a same proximity-based service entity or may belong to different proximity-based service entities.

Embodiment 1

Figure 1:
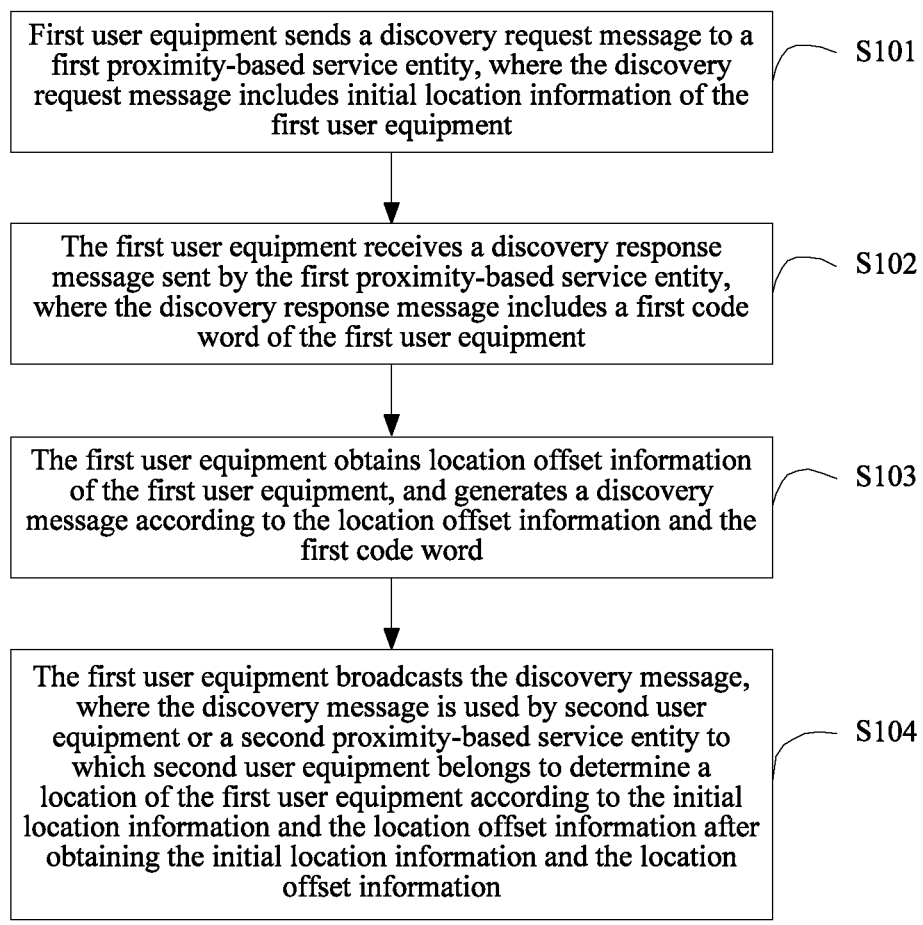
FIG. 1 is a schematic flowchart of an inter-user equipment discovery method according to an embodiment of the present disclosure.

This embodiment of the present disclosure provides an inter-user equipment discovery method. As shown in FIG. 1, the method includes the following steps.

S101. First user equipment sends a discovery request message to a first proximity-based service entity, where the discovery request message includes initial location information of the first user equipment.

Specifically, the discovery request message is used to request a first code word from the first proximity-based service entity. The first code word is a code word that is allocated by the first proximity-based service entity to the first user equipment for broadcasting. The initial location information is location information of the first user equipment that is obtained by the first user equipment before sending the discovery request message. For example, the initial location information may be GPS coordinates that are obtained by the first user equipment by using a GPS positioning function of the first user equipment. The first proximity-based service entity saves the initial location information.

Notably, a process in which the first proximity-based service entity allocates the first code word to the first user equipment may proceed according to an existing protocol. In the existing protocol, the discovery request message may further include an application layer identifier, an international mobile subscriber identity (IMSI) of the first user equipment, and an application program identifier.

In this way, the first proximity-based service entity may authenticate and charge the first user equipment according to the IMSI, and after the authentication succeeds, obtain, from the application layer identifier, an identifier of a public land mobile network (PLMN) to which the first user equipment belongs, and generate, according to the identifier of the PLMN, the first code word allocated to the first user equipment.

S102. The first user equipment receives a discovery response message sent by the first proximity-based service entity, where the discovery response message includes a first code word of the first user equipment.

The first code word includes the identifier of the PLMN to which the first user equipment belongs.

S103. The first user equipment obtains location offset information of the first user equipment, and generates a discovery message according to the location offset information and the first code word.

The location offset information is an offset between a current location and an initial location of the first user equipment.

Specifically, the discovery message includes the first code word and the location offset information. In a possible implementation manner of this embodiment of the present disclosure, the first code word includes a reserved bit. In this way, after determining the offset between the current location and the initial location, the first user equipment encodes the offset, to obtain the location offset information, and integrates the location offset information into the reserved bit in the first code word. After the integration, a new code word may be obtained. The discovery message includes the new code word.

The following describes in detail a method for obtaining location offset information by encoding an offset provided in this embodiment of the present disclosure.

First, it should be noted that the offset may be an angle offset. In this way, a user may preset a maximum angle offset ?. Further, an actual angle offset is encoded according to a quantity N of reserved bits in the first code word.

For example, ?=0.09, N=28, and if a longitudinal angle offset and a latitudinal angle offset each occupy 14 bits, precision of angle offsets in both longitudinal and latitudinal directions is: 0.09 divided by the 14th power of 2.

In this way, after determining an actual longitudinal angle offset ?1, the first user equipment may obtain, by converting a decimal number that is obtained by first dividing ?1 by 0.09 and then multiplying a quotient by the 14th power of 2 to a binary number, values of seven bits that represent the longitudinal angle offset. Similarly, after determining an actual latitudinal angle offset ?2, the first user equipment may obtain values of seven bits that represent the latitudinal angle offset.

It should be noted that, according to a definition of GPS encoding in 3GPP, the longitude and the latitude each need to occupy 24 bits, and 48 bits are occupied in total. Compared with the prior art, in this embodiment of the present disclosure, a location offset has a smaller range of data that needs to be encoded compared with all GPS coordinates. Therefore, a quantity of bits occupied by the location offset information accounts for a small proportion, so that the discovery message can carry more information, thereby facilitating service expansion.

In addition, notably, the integrating the first code word and the location offset information to generate a discovery message is merely a possible implementation manner. Alternatively, considering possible service expansion, in a specific implementation of the present disclosure, a discovery message may be generated by using the first code word, the location offset information, and other related information according to an actual requirement. This is not limited in the present disclosure.

Moreover, if the offset between the current location and the initial location of the first user equipment is greater than a preset maximum offset, current location information of the first user equipment is sent to the first proximity-based service entity, so that the first proximity-based service entity updates the initial location information by using the current location information of the first user equipment.

That is, if an angle offset of the first user equipment has exceeded a range that can be indicated by the reserved bit in the first code word, the current location information of the first user equipment may be sent to the first proximity-based service entity, so as to update the initial location information saved in the first proximity-based service entity.

After the initial location information is updated, the first user equipment may re-obtain an offset between the current location and the updated initial location, and generate the discovery message according to offset information and the first code word after determining that the offset is not greater than the preset maximum offset.

S104. The first user equipment broadcasts the discovery message, where the discovery message is used by the second user equipment or a second proximity-based service entity to which the second user equipment belongs to determine a location of the first user equipment according to the initial location information and the location offset information after obtaining the initial location information and the location offset information.

For example, after receiving the discovery message broadcast by the first user equipment, the second user equipment may parse the discovery message to obtain the location offset information of the first user equipment, and send a request to obtain the initial location information from the second proximity-based service entity.

Notably, if the first user equipment and the second user equipment belong to a same proximity-based service entity, that is, the first proximity-based service entity and the second proximity-based service entity are a same proximity-based service entity, after receiving the request of the second user equipment, the second proximity-based service entity may directly send the saved initial location information to the second user equipment.

If the first proximity-based service entity and the second proximity-based service entity are not a same proximity-based service entity, the second proximity-based service entity may initiate a listen request message to the first proximity-based service entity, to obtain the initial location information saved in the first proximity-based service entity.

Specifically, before receiving the discovery message broadcast by the first user equipment, the second user equipment may send a discovery request message to the second proximity-based service entity. The second proximity-based service entity may determine, according to the application layer identifier in the discovery request message, the identifier of the PLMN to which the first user equipment belongs. In this way, the first proximity-based service entity sends the listen request message to the first proximity-based service entity according to the identifier of the PLMN, to obtain the initial location information saved in the first proximity-based service entity.

In this way, the second user equipment may determine the location of the first user equipment according to the initial location information and the location offset information of the first user equipment.

Moreover, after receiving the discovery message broadcast by the first user equipment, the second user equipment may alternatively send the discovery message to the second proximity-based service entity, so that the second proximity-based service entity determines the location of the first user equipment according to the initial location information and the location offset information of the first user equipment, and sends location information of the first user equipment to the second user equipment.

By means of the foregoing solution, because a discovery message broadcast by first user equipment carries location offset information, another user equipment cannot determine a location of the first user equipment only according to the location offset information, thereby preventing the location of the user equipment from being exposed, and resolving a problem of user privacy leakage.

Embodiment 2

Figure 2:
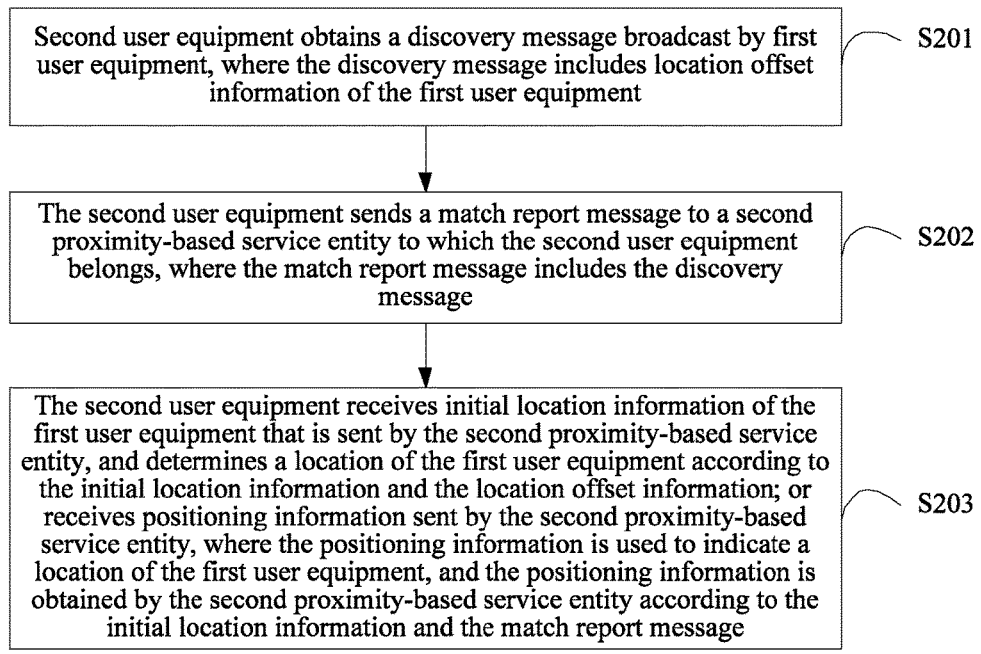
FIG. 2 is a schematic flowchart of another inter-user equipment discovery method according to an embodiment of the present disclosure.

This embodiment of the present disclosure provides another inter-user equipment discovery method. As shown in FIG. 2, the method includes the following steps.

S201. Second user equipment obtains a discovery message broadcast by first user equipment, where the discovery message includes location offset information of the first user equipment.

The location offset information is an offset between a current location and an initial location of the first user equipment.

Specifically, before broadcasting the discovery message, the first user equipment sends a discovery request message to a first proximity-based service entity, where the discovery request message includes initial location information of the first user equipment, and receives a discovery response message sent by the first proximity-based service entity, where the discovery response message includes a first code word of the first user equipment. Further, the first user equipment obtains the location offset information of the first user equipment, and generates the discovery message according to the location offset information and the first code word.

S202. The second user equipment sends a match report message to a second proximity-based service entity to which the second user equipment belongs, where the match report message includes the discovery message.

Specifically, according to an existing protocol, the match report message is used to request an application layer identifier that corresponds to the first user equipment, so that the second user equipment authenticates the first user equipment according to the application layer identifier. The second proximity-based service entity may obtain, from the discovery message, an identifier of a PLMN to which the first user equipment belongs, and obtain the application layer identifier from the first proximity-based service entity according to the identifier of the PLMN.

S203. The second user equipment receives initial location information of the first user equipment that is sent by the second proximity-based service entity, and determines a location of the first user equipment according to the initial location information and the location offset information; or receives positioning information sent by the second proximity-based service entity, where the positioning information is used to indicate a location of the first user equipment, and the positioning information is obtained by the second proximity-based service entity according to the initial location information and the match report message.

The following describes in detail two implementation manners of step S203.

Manner 1: The match report message includes an initial location request indication, and after receiving the match report message, the second proximity-based service entity sends the initial location information of the first user equipment to the second user equipment according to the initial location request indication, so that the second user equipment determines the location of the first user equipment according to the initial location information and the location offset information.

Specifically, if the first user equipment and the second user equipment belong to a same proximity-based service entity, that is, the first proximity-based service entity and the second proximity-based service entity are a same proximity-based service entity, after receiving the match report message, the second proximity-based service entity may directly send the saved initial location information to the second user equipment according to the initial location request indication. If the first proximity-based service entity and the second proximity-based service entity are not a same proximity-based service entity, the second proximity-based service entity may initiate a listen request message to the first proximity-based service entity, to obtain the initial location information saved in the first proximity-based service entity, and after receiving the match report message, send, to the second user equipment according to the initial location request indication, the initial location information obtained from the first proximity-based service entity.

Manner 2: The match report message includes a location request indication, and after receiving the match report information, the second proximity-based service entity obtains the positioning information according to the match report message and the initial location information, and sends the positioning information to the second user equipment.

In an optional implementation manner of manner 2, the second proximity-based service entity obtains the location offset information in the discovery message, and determines the location of the first user equipment according to the initial location information and the location offset information of the first user equipment. The positioning information includes location information of the first user equipment.

For the method for obtaining the initial location information of the first user equipment by the second proximity-based service entity, refer to the corresponding description in manner 1, and details are not described herein again.

In another optional implementation manner of manner 2, the match report message further includes location information of the second user equipment. In this way, after determining the location of the first user equipment, the second proximity-based service entity may further determine a distance between the first user equipment and the second user equipment according to the location information of the second user equipment. The positioning information includes distance information between the first user equipment and the second user equipment.

By means of the foregoing solution, because a discovery message broadcast by first user equipment carries location offset information, another user equipment cannot determine a location of the first user equipment only according to the location offset information, thereby preventing the location of the user equipment from being exposed, and resolving a problem of user privacy leakage.

Embodiment 3

Figure 3:
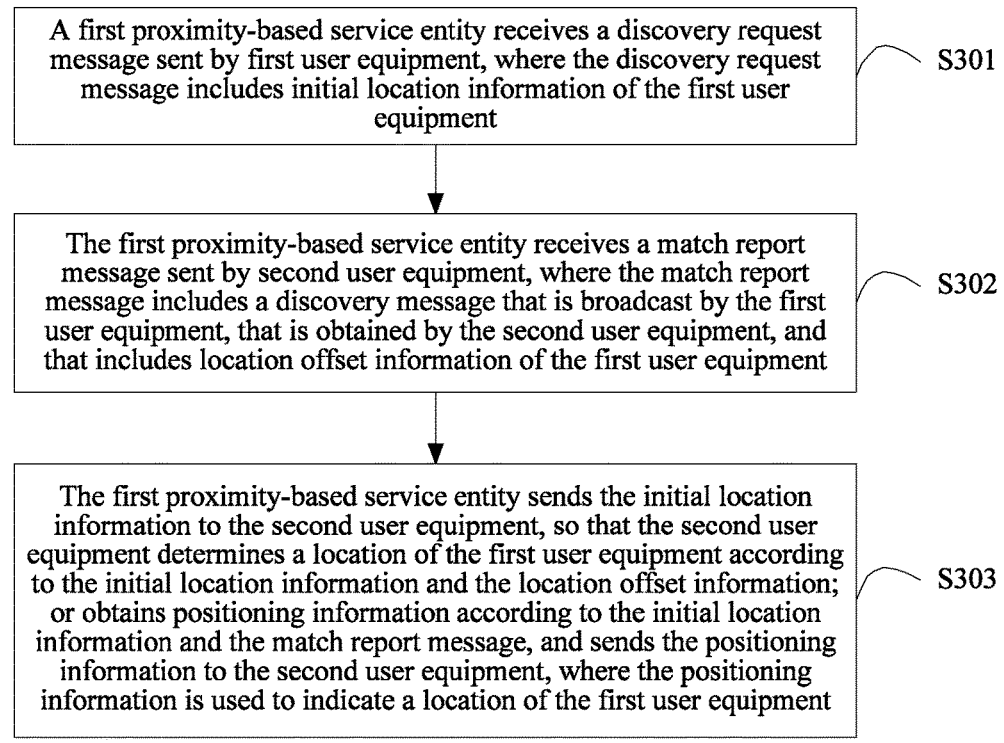
FIG. 3 is a schematic flowchart of still another inter-user equipment discovery method according to an embodiment of the present disclosure.

This embodiment of the present disclosure provides still another inter-user equipment discovery method. The method is applied to a case in which first user equipment and second user equipment belong to a same proximity-based service entity. As shown in FIG. 3, the method includes the following steps.

S301. A first proximity-based service entity receives a discovery request message sent by first user equipment, where the discovery request message includes initial location information of the first user equipment.

Specifically, the discovery request message is used to request a first code word from the first proximity-based service entity. The first code word is a code word that is allocated by the first proximity-based service entity to the first user equipment for broadcasting. The initial location information is location information of the first user equipment that is obtained by the first user equipment before sending the discovery request message. For example, the initial location information may be GPS coordinates that are obtained by the first user equipment by using a GPS positioning function of the first user equipment.

Further, the first proximity-based service entity saves the initial location information, and sends a discovery response message to the first user equipment, where the discovery response message includes the first code word of the first user equipment, so that the first user equipment generates a discovery message according to location offset information and the first code word after obtaining the location offset information, and broadcasts the discovery message.

S302. The first proximity-based service entity receives a match report message sent by second user equipment, where the match report message includes a discovery message that is broadcast by the first user equipment, that is obtained by the second user equipment, and that includes location offset information of the first user equipment.

Specifically, the second user equipment sends the match report message to the first proximity-based service entity after receiving the discovery message broadcast by the first user equipment.

S303. The first proximity-based service entity sends the initial location information to the second user equipment, so that the second user equipment determines a location of the first user equipment according to the initial location information and the location offset information; or obtains positioning information according to the initial location information and the match report message, and sends the positioning information to the second user equipment, where the positioning information is used to indicate a location of the first user equipment.

The following describes in detail two implementation manners of step S303.

Manner 1: After receiving the match report message, the first proximity-based service entity sends the saved initial location information of the first user equipment to the second user equipment, so that the second user equipment determines the location of the first user equipment according to the initial location information and the location offset information.

Manner 2: The first proximity-based service entity obtains the positioning information according to the match report message and the initial location information, and sends the positioning information to the second user equipment.

In an implementation manner of manner 2, the first proximity-based service entity determines the location of the first user equipment according to the initial location information and the location offset information. The positioning information includes location information of the first user equipment. The second user equipment determines the location of the first user equipment according to the location information.

In another implementation manner of manner 2, if the match report message further includes location information of the second user equipment, after determining the location of the first user equipment according to the location offset information in the discovery message and the initial location information, the first proximity-based service entity determines a distance between the first user equipment and the second user equipment according to the location information of the second user equipment. The positioning information includes distance information between the first user equipment and the second user equipment. The second user equipment determines the location of the first user equipment according to the distance information.

By means of the foregoing solution, because a discovery message broadcast by first user equipment carries location offset information, another user equipment cannot determine a location of the first user equipment only according to the location offset information, thereby preventing the location of the user equipment from being exposed, and resolving a problem of user privacy leakage.

Embodiment 4

Figure 4:
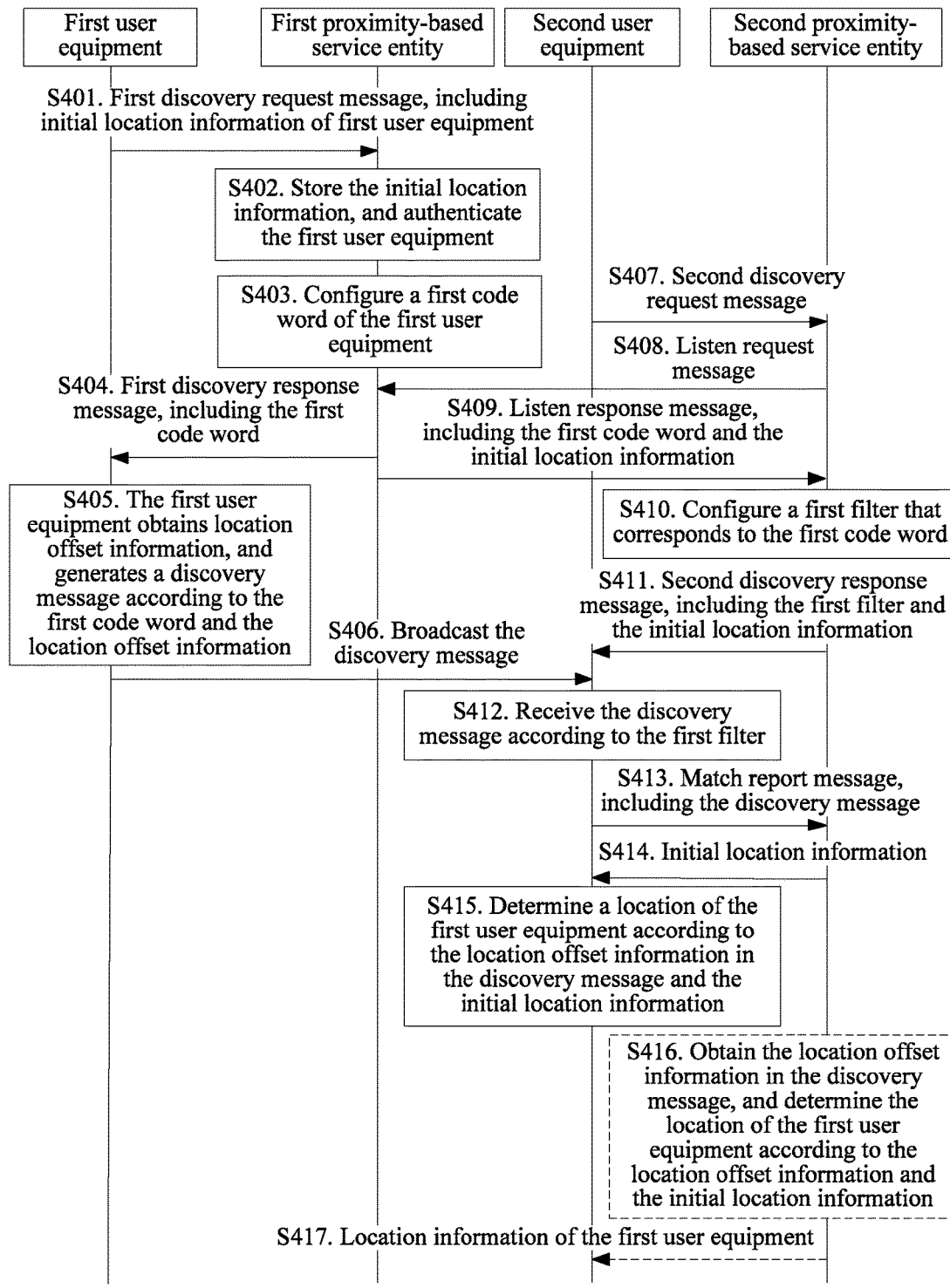
FIG. 4 is a schematic flowchart of still another inter-user equipment discovery method according to an embodiment of the present disclosure.

To enable a person skilled in the art to understand more clearly a technical solution of an inter-user equipment discovery method provided in the present disclosure, the following provides detailed descriptions by using a detailed embodiment. As shown in FIG. 4, the method includes the following steps.

S401. First user equipment sends a first discovery request message to a first proximity-based service entity, where the first discovery request message includes initial location information of the first user equipment.

S402. The first proximity-based service entity saves the initial location information, and authenticates the first user equipment.

Further, after authenticating the first user equipment, the first proximity-based service entity performs step S403.

S403. The first proximity-based service entity configures a first code word of the first user equipment.

S404. The first proximity-based service entity sends a first discovery response message to the first user equipment, where the discovery response message includes the first code word.

S405. The first user equipment obtains location offset information, and generates a discovery message according to the first code word and the location offset information.

The location offset information is an offset between a current location and an initial location of the first user equipment.

S406. The first user equipment broadcasts the discovery message.

S407. Second user equipment sends a second discovery request message to a second proximity-based service entity.

S408. The second proximity-based service entity sends a listen request message to the first proximity-based service entity according to the second discovery request message.

Specifically, the second discovery request message includes an application layer identifier of the first user equipment. The second proximity-based service entity may determine, according to the application layer identifier, an identifier of a PLMN to which the first user equipment belongs. In this way, the second proximity-based service entity sends the listen request message to the first proximity-based service entity according to the identifier of the PLMN, to obtain the first code word and the initial location information.

S409. The first proximity-based service entity sends, to the second proximity-based service entity, a listen response message that includes the first code word and the initial location information.

S410. The second proximity-based service entity configures a first filter that corresponds to the first code word.

It should be noted that for a code word broadcast by user equipment, another user equipment needs to use a filter that matches the code word to correctly receive the code word. That is, only user equipment that uses the first filter can receive the discovery message that is generated by integrating the first code word and the location offset information.

S411. The second proximity-based service entity sends, to the second user equipment, a discovery response message that includes the first filter and the initial location information.

S412. The second user equipment receives the discovery message according to the first filter.

S413. The second user equipment sends a match report message to the second proximity-based service entity.

The match report message includes the discovery message.

Further, after the second proximity-based service entity receives the match report message, there are two implementation manners. In manner 1, step S414 to step S415 are performed. In manner 2, step S416 to step S417 are performed.

S414. The second proximity-based service entity sends the initial location information to the second user equipment according to the match report message.

Specifically, the initial location information is obtained by the second proximity-based service entity from the first proximity-based service entity by means of step S407 to step S410. Optionally, the second proximity-based service entity may alternatively request the initial location information from the first proximity-based service entity after receiving the match report message. This is not limited in the present disclosure.

S415. The second user equipment determines a location of the first user equipment according to the location offset information in the discovery message and the initial location information.

S416. The second proximity-based service entity obtains the location offset information in the discovery message, and determines the location of the first user equipment according to the location offset information and the initial location information.

S417. The second proximity-based service entity sends location information of the first user equipment to the second user equipment.

Optionally, the match report message may further include location information of the second user equipment. In this case, in manner 2, after determining the location of the first user equipment, the second proximity-based service entity may further determine a distance between the first user equipment and the second user equipment according to the location information of the second user equipment, and send distance information between the first user equipment and the second user equipment to the second user equipment.

It should be noted that, the steps shown in FIG. 4 are merely examples for description. For ease of description, the steps are described as a series of action combinations, but a person skilled in the art should know that, the present disclosure is not limited by a sequence of described actions.

In this way, each time first user equipment performs broadcasting, the first user equipment exposes location offset information in an air interface, and another user equipment cannot determine a location of the first user equipment only according to the location offset information, thereby avoiding possible user privacy leakage.

Embodiment 5

Figure 5:
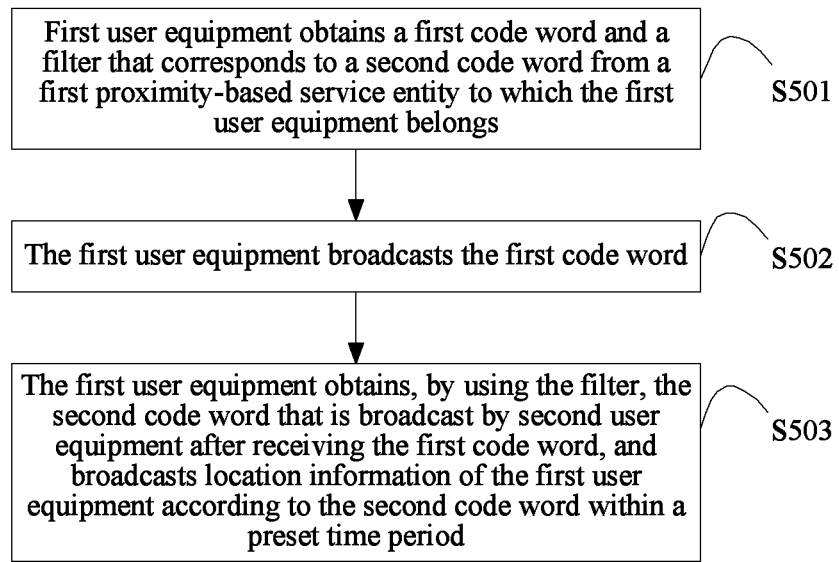
FIG. 5 is a schematic flowchart of still another inter-user equipment discovery method according to an embodiment of the present disclosure.

This embodiment of the present disclosure provides still another inter-user equipment discovery method. As shown in FIG. 5, the method includes the following steps.

S501. First user equipment obtains a first code word and a filter that corresponds to a second code word from a first proximity-based service entity to which the first user equipment belongs.

Specifically, the first code word is allocated by the first proximity-based service entity to the first user equipment after the first user equipment sends a first discovery request message to the first proximity-based service entity, the first proximity-based service entity authenticates the first user equipment according to the first discovery request message, and the authentication succeeds.

For example, the first user equipment sends a first discovery request message to the first proximity-based service entity to which the first user equipment belongs, where the first discovery request message includes first indication information, and the first indication information is used to instruct the first proximity-based service entity to configure the second code word and the filter that corresponds to the second code word, and receives a first discovery response message sent by the first proximity-based service entity, where the first discovery response message includes the first code word and the filter.

S502. The first user equipment broadcasts the first code word.

S503. The first user equipment obtains, by using the filter, the second code word that is broadcast by a second user equipment after receiving the first code word, and broadcasts location information of the first user equipment according to the second code word within a preset time period.

It should be noted that the filter uniquely corresponds to the second code word. That is, only the first user equipment can receive, by using the filter, the second code word broadcast by the second user equipment.

Moreover, the second user equipment obtains the second code word from the first proximity-based service entity. Specifically, if the first user equipment and the second user equipment belong to a same proximity-based service entity, after receiving a second discovery request message sent by the second user equipment, the first proximity-based service entity sends a second discovery response message that includes the second code word to the second user equipment. If the first user equipment and the second user equipment belong to different proximity-based service entities, a second proximity-based service entity corresponding to the second user equipment may send a listen request message to the first proximity-based service entity, to obtain the second code word in the first proximity-based service entity, and send the second code word to the second user equipment.

In this way, after receiving the first code word broadcast by the first user equipment, the second user equipment begins to broadcast the second code word. After receiving the second code word by using the corresponding filter, the first user equipment broadcasts the location information of the first user equipment within the preset time period. The first user equipment broadcasts the location information only within the preset time period, thereby preventing the location information from being long exposed in an air interface, and reducing a risk of user privacy leakage.

Embodiment 6

Figure 6:
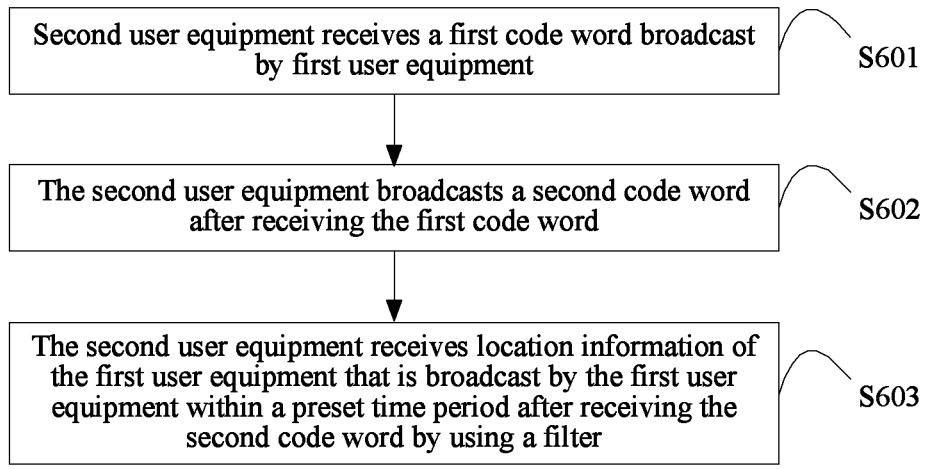
FIG. 6 is a schematic flowchart of still another inter-user equipment discovery method according to an embodiment of the present disclosure.

This embodiment of the present disclosure provides still another inter-user equipment discovery method. As shown in FIG. 6, the method includes the following steps.

S601. Second user equipment receives a first code word broadcast by first user equipment.

Specifically, the first code word is allocated by a first proximity-based service entity to the first user equipment after the first user equipment sends a first discovery request message to the first proximity-based service entity, the first proximity-based service entity authenticates the first user equipment according to the first discovery request message, and the authentication succeeds.

S602. The second user equipment broadcasts a second code word after receiving the first code word.

The second code word is obtained by the second user equipment from a second proximity-based service entity to which the second user equipment belongs.

S603. The second user equipment receives location information of the first user equipment that is broadcast by the first user equipment within a preset time period after receiving the second code word by using a filter.

The filter uniquely corresponds to the second code word.

Specifically, before broadcasting the first code word, the first user equipment instructs the first proximity-based service entity to which the first user equipment belongs to configure the second code word and the filter that corresponds to the second code word, and receives the filter sent by the first proximity-based service entity.

Before broadcasting the second code word, the second user equipment sends a second discovery request message to the second proximity-based service entity, where the second discovery request message includes second indication information, and the second indication information is used to request the second code word from the second proximity-based service entity; and receives a second discovery response message sent by the second proximity-based service entity, where the second discovery response message includes the second code word.

Specifically, if the first user equipment and the second user equipment belong to a same proximity-based service entity, after receiving the second discovery request message sent by the second user equipment, the second proximity-based service entity sends the second discovery response message that includes the second code word to the second user equipment. If the first user equipment and the second user equipment belong to different proximity-based service entities, the second proximity-based service entity corresponding to the second user equipment may send a listen request message to the first proximity-based service entity that corresponds to the first user equipment, to obtain the second code word in the first proximity-based service entity, and send the second code word to the second user equipment.

In this way, after receiving the first code word broadcast by the first user equipment, the second user equipment begins to broadcast the second code word. After receiving the second code word by using the corresponding filter, the first user equipment broadcasts the location information of the first user equipment within the preset time period. The first user equipment broadcasts the location information only within the preset time period, thereby preventing the location information from being long exposed in an air interface, and reducing a risk of user privacy leakage.

Embodiment 7

Figure 7:
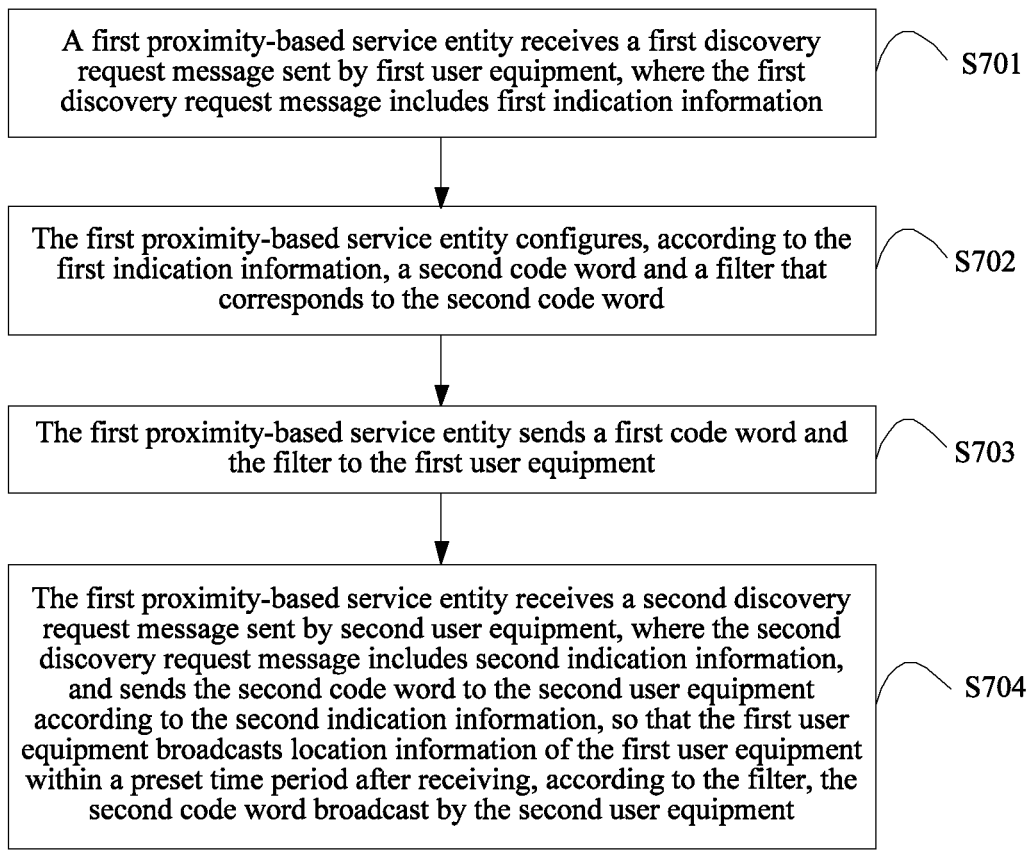
FIG. 7 is a schematic flowchart of still another inter-user equipment discovery method according to an embodiment of the present disclosure.

This embodiment of the present disclosure provides still another inter-user equipment discovery method. This embodiment of the present disclosure is applicable to a case in which first user equipment and second user equipment correspond to a same proximity-based service entity. As shown in FIG. 7, the method includes the following steps.

S701. A first proximity-based service entity receives a first discovery request message sent by first user equipment, where the first discovery request message includes first indication information.

S702. The first proximity-based service entity configures, according to the first indication information, a second code word and a filter that corresponds to the second code word.

S703. The first proximity-based service entity sends a first code word and the filter to the first user equipment.

Specifically, the first code word is a code word that is allocated by the first proximity-based service entity to the first user equipment for broadcasting after the first proximity-based service entity authenticates the first user equipment according to the first discovery request message and the authentication succeeds.

S704. The first proximity-based service entity receives a second discovery request message sent by the second user equipment, where the second discovery request message includes second indication information, and sends the second code word to the second user equipment according to the second indication information, so that the first user equipment broadcasts location information of the first user equipment within a preset time period after receiving, according to the filter, the second code word broadcast by the second user equipment.

Specifically, after receiving the first code word broadcast by the first user equipment, the second user equipment begins to broadcast the second code word obtained from the first proximity-based service entity. After receiving the second code word by using the corresponding filter, the first user equipment broadcasts the location information of the first user equipment within the preset time period, so that the second user equipment determines a location of the first user equipment according to the location information after receiving the location information.

The first user equipment broadcasts the location information only within the preset time period, thereby preventing the location information from being long exposed in an air interface, and reducing a risk of user privacy leakage.

Embodiment 8

Figure 8:
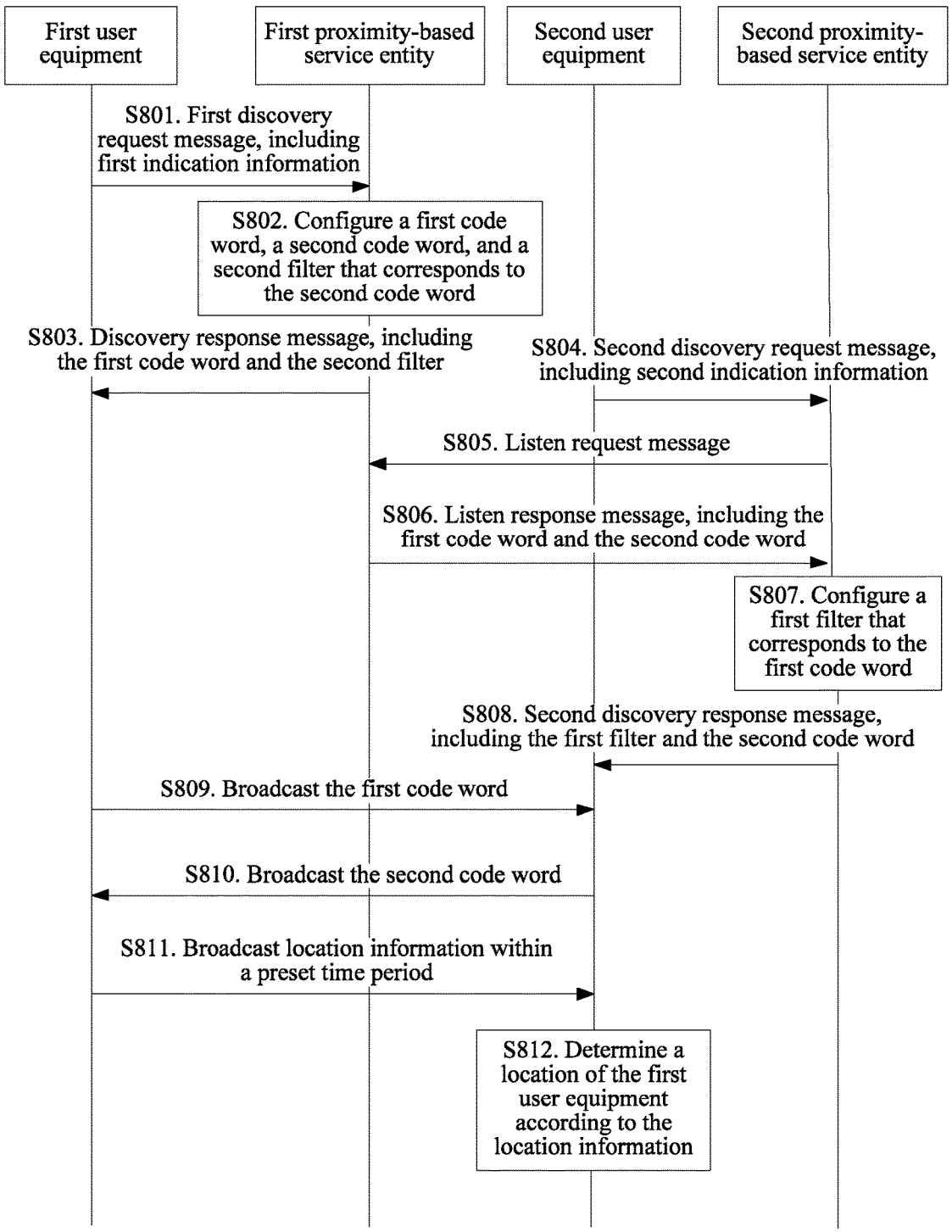
FIG. 8 is a schematic flowchart of still another inter-user equipment discovery method according to an embodiment of the present disclosure.

To enable a person skilled in the art to understand more clearly a technical solution of an inter-user equipment discovery method provided in the present disclosure, the following provides detailed descriptions by using a detailed embodiment. As shown in FIG. 8, the method includes the following steps.

S801. First user equipment sends a first discovery request message to a first proximity-based service entity, where the first discovery request message includes first indication information.

The first indication information is used to instruct the first proximity-based service entity to configure a second code word and a second filter that corresponds to the second code word.

S802. The first proximity-based service entity configures, according to the discovery request message, a first code word, a second code word, and a second filter that corresponds to the second code word.

A process in which the first proximity-based service entity configures the first code word may proceed according to an existing protocol. In this embodiment of the present disclosure, the first indication information is added to an existing discovery request message, to instruct the first proximity-based service entity to configure the second code word and the second filter according to the first indication information.

S803. The first proximity-based service entity sends a discovery response message to the first user equipment, where the discovery response message includes the first code word and the second filter.

S804. Second user equipment sends a second discovery request message to a second proximity-based service entity, where the second discovery request message includes second indication information.

The second indication information is used to request the second code word from the second proximity-based service entity.

S805. The second proximity-based service entity sends a listen request message to the first proximity-based service entity according to the second discovery request message.

S806. The first proximity-based service entity sends, to the second proximity-based service entity, a listen response message that includes the first code word and the second code word.

S807. The second proximity-based service entity configures a first filter that corresponds to the first code word.

S808. The second proximity-based service entity sends, to the second user equipment, a second discovery response message that includes the first filter and the second code word.

S809. The first user equipment broadcasts the first code word.

S810. The second user equipment broadcasts the second code word after receiving the first code word by using the first filter.

S811. The first user equipment broadcasts location information within a preset time period after receiving the second code word by using the second filter.

S812. The second user equipment receives the location information, and determines a location of the first user equipment according to the location information.

In this way, the first user equipment broadcasts the location information only within the preset time period, thereby preventing the location information from being long exposed in an air interface, and reducing a risk of user privacy leakage.

It should be noted that, the steps shown in FIG. 8 are merely examples for description. For ease of description, the steps are described as a series of action combinations, but a person skilled in the art should know that, the present disclosure is not limited by a sequence of described actions.

Embodiment 9

Figure 9:
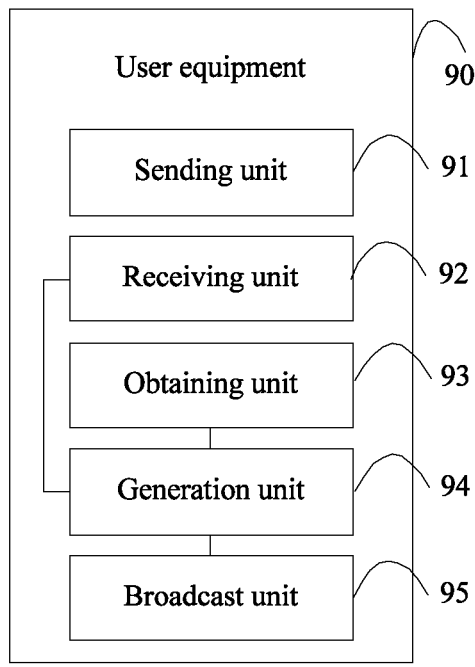
FIG. 9 is a schematic structural diagram of user equipment according to an embodiment of the present disclosure.

This embodiment of the present disclosure provides user equipment 900, configured to implement the method embodiment shown in FIG. 1. As shown in FIG. 9, the user equipment 90 includes:

a sending unit 91, configured to send a discovery request message to a first proximity-based service entity, where the discovery request message includes initial location information of the user equipment;

a receiving unit 92, configured to receive a discovery response message sent by the first proximity-based service entity, where the discovery response message includes a first code word of the user equipment;

an obtaining unit 93, configured to obtain location offset information of the user equipment;

a generation unit 94, configured to generate a discovery message according to the location offset information and the first code word, where the location offset information is an offset between a current location and an initial location of the user equipment; and a broadcast unit 95, configured to broadcast the discovery message, where the discovery message is used by the second user equipment or a second proximity-based service entity to which the second user equipment belongs to determine a location of the user equipment according to the initial location information and the location offset information after obtaining the initial location information and the location offset information.

Specifically, the first code word is a code word that is allocated by the first proximity-based service entity to the user equipment for broadcasting. The initial location information is location information of the user equipment that is obtained by the user equipment before sending the discovery request message. For example, the initial location information may be GPS coordinates that are obtained by the user equipment by using a GPS positioning function of the user equipment. The first proximity-based service entity saves the initial location information.

The discovery message includes the first code word and the location offset information. In a possible implementation manner of this embodiment of the present disclosure, the first code word includes a reserved bit. In this way, after determining the offset between the current location and the initial location, the user equipment encodes the offset, to obtain the location offset information, and integrates the location offset information into the reserved bit in the first code word. After the integration, a new code word may be obtained. The discovery message includes the new code word.

It should be noted that, according to a definition of GPS encoding in 3GPP, the longitude and the latitude each need to occupy 24 bits, and 48 bits are occupied in total. Compared with the prior art, in this embodiment of the present disclosure, a location offset has a smaller range of data that needs to be encoded compared with all GPS coordinates. Therefore, a quantity of bits occupied by the location offset information accounts for a small proportion, so that the discovery message can carry more information, thereby facilitating service expansion.

Optionally, the sending unit 91 is further configured to: when the offset between the current location and the initial location of the user equipment is greater than a preset maximum offset, send current location information of the user equipment to the first proximity-based service entity, so that the first proximity-based service entity updates the initial location information by using the current location information of the user equipment.

That is, if an angle offset of the user equipment has exceeded a range that can be indicated by the reserved bit in the first code word, the current location information of the user equipment may be sent to the first proximity-based service entity, so as to update the initial location information saved in the first proximity-based service entity.

After the initial location information is updated, the user equipment may re-obtain an offset between the current location and the updated initial location, and generate the discovery message according to offset information and the first code word after determining that the offset is not greater than the preset maximum offset.

Further, after receiving the discovery message broadcast by the user equipment, the second user equipment may parse the discovery message to obtain the location offset information of the user equipment, and send a request to obtain the initial location information from the second proximity-based service entity.

Notably, if the user equipment and the second user equipment belong to a same proximity-based service entity, that is, the first proximity-based service entity and the second proximity-based service entity are a same proximity-based service entity, after receiving the request of the second user equipment, the second proximity-based service entity may directly send the saved initial location information to the second user equipment.

If the first proximity-based service entity and the second proximity-based service entity are not a same proximity-based service entity, the second proximity-based service entity may initiate a listen request message to the first proximity-based service entity, to obtain the initial location information saved in the first proximity-based service entity.

Specifically, before receiving the discovery message broadcast by the user equipment, the second user equipment may send a discovery request message to the second proximity-based service entity. The second proximity-based service entity may determine, according to an application layer identifier in the discovery request message, an identifier of a PLMN to which the user equipment belongs. In this way, the first proximity-based service entity sends the listen request message to the first proximity-based service entity according to the identifier of the PLMN, to obtain the initial location information saved in the first proximity-based service entity.

In this way, the second user equipment may determine the location of the user equipment according to the initial location information and the location offset information of the user equipment.

Moreover, after receiving the discovery message broadcast by the user equipment, the second user equipment may alternatively send the discovery message to the second proximity-based service entity, so that the second proximity-based service entity determines the location of the user equipment according to the initial location information and the location offset information of the user equipment, and sends the location information of the user equipment to the second user equipment.

It may be clearly understood by a person skilled in the art that, for the purpose of convenient and brief description, for a detailed working process and description of the foregoing user equipment, refer to a corresponding process in the foregoing method embodiment, and details are not described herein again.

By means of the foregoing user equipment, because a discovery message broadcast by the user equipment carries location offset information, another user equipment cannot determine a location of the user equipment only according to the location offset information, thereby preventing the location of the user equipment from being exposed, and resolving a problem of user privacy leakage.

Embodiment 10

Figure 10:
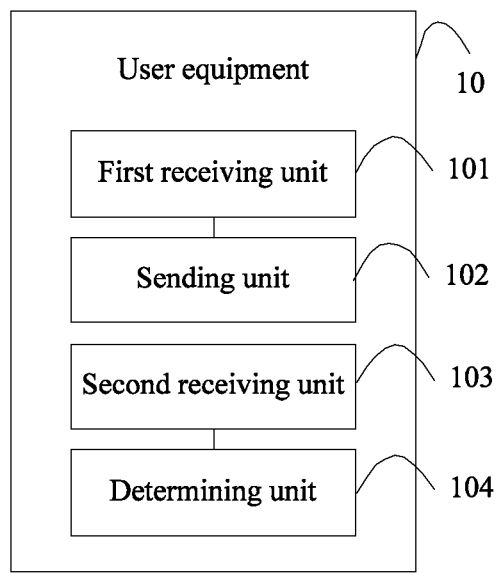
FIG. 10 is a schematic structural diagram of another user equipment according to an embodiment of the present disclosure.

This embodiment of the present disclosure provides another user equipment 10, configured to implement the method embodiment that corresponds to FIG. 2. As shown in FIG. 10, the user equipment 10 includes:

a first receiving unit 101, configured to obtain a discovery message broadcast by first user equipment, where the discovery message includes location offset information of the first user equipment, and the location offset information is an offset between a current location and an initial location of the first user equipment;

a sending unit 102, configured to send a match report message to a second proximity-based service entity to which the user equipment belongs, where the match report message includes the discovery message; and a second receiving unit 103, configured to receive positioning information sent by the second proximity-based service entity, where the positioning information is used to indicate a location of the first user equipment, and the positioning information is obtained by the second proximity-based service entity according to the initial location information and the match report message; or the second receiving unit 103, configured to receive initial location information of the first user equipment that is sent by the second proximity-based service entity, where the user equipment further includes a determining unit 104, configured to determine a location of the first user equipment according to the initial location information and the location offset information.

Specifically, before broadcasting the discovery message, the first user equipment sends a discovery request message to a first proximity-based service entity, where the discovery request message includes the initial location information of the first user equipment, and receives a discovery response message sent by the first proximity-based service entity, where the discovery response message includes a first code word of the first user equipment. Further, the first user equipment obtains the location offset information of the first user equipment, and generates the discovery message according to the location offset information and the first code word.

Further, the location of the first user equipment may be determined in the following two manners.

Manner 1: The match report message includes an initial location request indication, and after receiving the match report message, the second proximity-based service entity sends the initial location information of the first user equipment to the user equipment according to the initial location request indication, so that the user equipment determines the location of the first user equipment according to the initial location information and the location offset information.

Specifically, if the first user equipment and the user equipment belong to a same proximity-based service entity, that is, the first proximity-based service entity and the second proximity-based service entity are a same proximity-based service entity, after receiving the match report message, the second proximity-based service entity may directly send the saved initial location information to the user equipment according to the initial location request indication. If the first proximity-based service entity and the second proximity-based service entity are not a same proximity-based service entity, the second proximity-based service entity may initiate a listen request message to the first proximity-based service entity, to obtain the initial location information saved in the first proximity-based service entity, and after receiving the match report message, send, to the user equipment according to the initial location request indication, the initial location information obtained from the first proximity-based service entity.

Manner 2: The match report message includes a location request indication, and after receiving the match report information, the second proximity-based service entity obtains the positioning information according to the match report message and the initial location information, and sends the positioning information to the user equipment.

In an optional implementation manner of manner 2, the second proximity-based service entity obtains the location offset information in the discovery message, and determines the location of the first user equipment according to the initial location information and the location offset information of the first user equipment. The positioning information includes location information of the first user equipment.

For the method for obtaining the initial location information of the first user equipment by the second proximity-based service entity, refer to the corresponding description in manner 1, and details are not described herein again.

In another optional implementation manner of manner 2, the match report message further includes location information of the user equipment. In this way, after determining the location of the first user equipment, the second proximity-based service entity may further determine a distance between the first user equipment and the second user equipment according to the location information of the user equipment. The positioning information includes distance information between the first user equipment and the user equipment.

It may be clearly understood by a person skilled in the art that, for the purpose of convenient and brief description, for a detailed working process and description of the foregoing user equipment, refer to a corresponding process in the foregoing method embodiment, and details are not described herein again.

By means of the foregoing user equipment, because a discovery message broadcast by first user equipment carries location offset information, another user equipment cannot determine a location of the first user equipment only according to the location offset information, but the user equipment or a second proximity-based service entity may determine the location of the first user equipment according to the location offset information and initial location information of the first user equipment, thereby preventing the location of the user equipment from being exposed, and resolving a problem of user privacy leakage.

Embodiment 11

Figure 11:
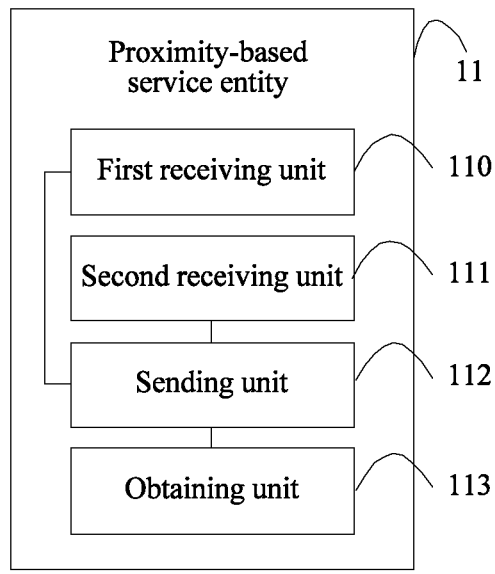
FIG. 11 is a schematic structural diagram of a proximity-based service entity according to an embodiment of the present disclosure.

This embodiment of the present disclosure provides a proximity-based service entity 11, configured to implement the method embodiment that corresponds to FIG. 3. As shown in FIG. 11, the proximity-based service entity 11 includes:

a first receiving unit 110, configured to receive a discovery request message sent by first user equipment, where the discovery request message includes initial location information of the first user equipment;

a second receiving unit 111, configured to receive a match report message sent by second user equipment, where the match report message includes a discovery message that is broadcast by the first user equipment, that is obtained by the second user equipment, and that includes location offset information of the first user equipment, where both the first user equipment and the second user equipment belong to the proximity-based service entity; and a sending unit 112, configured to send the initial location information to the second user equipment, so that the second user equipment determines a location of the first user equipment according to the initial location information and the location offset information; or the proximity-based service entity further including an obtaining unit 113, configured to obtain positioning information according to the initial location information and the match report message, and the sending unit 112, configured to send the positioning information to the second user equipment, where the positioning information is used to indicate a location of the first user equipment.

Specifically, a first code word is a code word that is allocated by the proximity-based service entity to the first user equipment for broadcasting. The initial location information is location information of the first user equipment that is obtained by the first user equipment before sending the discovery request message. For example, the initial location information may be GPS coordinates that are obtained by the first user equipment by using a GPS positioning function of the first user equipment.

Further, the proximity-based service entity saves the initial location information, and sends a discovery response message to the first user equipment, where the discovery response message includes a first code word of the first user equipment, so that the first user equipment generates a discovery message according to the location offset information and the first code word after obtaining the location offset information, and broadcasts the discovery message.

In a possible implementation manner of this embodiment of the present disclosure, after receiving the match report message, the proximity-based service entity sends the saved initial location information of the first user equipment to the second user equipment, so that the second user equipment determines the location of the first user equipment according to the initial location information and the location offset information.

In another possible implementation manner of this embodiment of the present disclosure, the obtaining unit 113 is specifically configured to determine the location of the first user equipment according to the initial location information and the location offset information, where the positioning information includes location information of the first user equipment. The second user equipment determines the location of the first user equipment according to the location information.

In another possible implementation manner this embodiment of the present disclosure, the match report message further includes location information of the second user equipment. The obtaining unit 113 is specifically configured to: determine the location of the first user equipment according to the initial location information and the location offset information; and determine a distance between the first user equipment and the second user equipment according to the location of the first user equipment and a location of the second user equipment. The positioning information includes distance information between the first user equipment and the second user equipment. The second user equipment determines the location of the first user equipment according to the distance information.

It may be clearly understood by a person skilled in the art that, for the purpose of convenient and brief description, for a detailed working process and description of the foregoing proximity-based service entity, refer to a corresponding process in the foregoing method embodiment, and details are not described herein again.

By means of the foregoing proximity-based service entity, because a discovery message broadcast by first user equipment carries location offset information, another user equipment cannot determine a location of the first user equipment only according to the location offset information, but the proximity-based service entity may determine the location of the first user equipment according to the location offset information and initial location information of the first user equipment, thereby preventing the location of the user equipment from being exposed, and resolving a problem of user privacy leakage.

Embodiment 12

Figure 12:
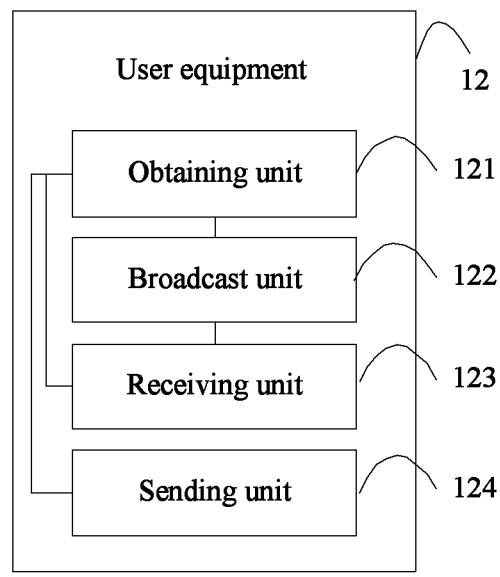
FIG. 12 is a schematic structural diagram of still another user equipment according to an embodiment of the present disclosure.

This embodiment of the present disclosure provides still another user equipment 12, configured to implement the method embodiment that corresponds to FIG. 5. As shown in FIG. 12, the user equipment 12 includes:

an obtaining unit 121, configured to obtain a first code word and a filter that corresponds to a second code word from a first proximity-based service entity to which the user equipment belongs;

a broadcast unit 122, configured to broadcast the first code word; and a receiving unit 123, configured to obtain, by using the filter, the second code word that is broadcast by second user equipment after receiving the first code word, where the broadcast unit 122 is further configured to broadcast location information of the user equipment according to the second code word within a preset time period.

Optionally, the user equipment 12 further includes:

a sending unit 124, configured to send a first discovery request message to the first proximity-based service entity, where the first discovery request message includes first indication information, and the first indication information is used to instruct the first proximity-based service entity to configure the second code word and the filter that corresponds to the second code word, where the obtaining unit 121 is specifically configured to receive a first discovery response message sent by the first proximity-based service entity, where the first discovery response message includes the first code word and the filter.

Specifically, the first code word is a code word that is allocated by the first proximity-based service entity to the user equipment for broadcasting.

For example, the user equipment sends a first discovery request message to the first proximity-based service entity to which the user equipment belongs, where the first discovery request message includes first indication information, and the first indication information is used to instruct the first proximity-based service entity to configure the second code word and the filter that corresponds to the second code word, and receives a first discovery response message sent by the first proximity-based service entity, where the first discovery response message includes the first code word and the filter.

It should be noted that the filter uniquely corresponds to the second code word. That is, only the user equipment can receive, by using the filter, the second code word broadcast by the second user equipment.

Moreover, the second user equipment obtains the second code word from the first proximity-based service entity. Specifically, if the user equipment and the second user equipment belong to a same proximity-based service entity, after receiving a second discovery request message sent by the second user equipment, the first proximity-based service entity sends a second discovery response message that includes the second code word to the second user equipment. If the user equipment and the second user equipment belong to different proximity-based service entities, a second proximity-based service entity corresponding to the second user equipment may send a listen request message to the first proximity-based service entity, to obtain the second code word in the first proximity-based service entity, and send the second code word to the second user equipment.

In this way, after receiving the first code word broadcast by the user equipment, the second user equipment begins to broadcast the second code word. After receiving the second code word by using the corresponding filter, the user equipment broadcasts the location information of the user equipment within the preset time period. The user equipment broadcasts the location information only within the preset time period, thereby preventing the location information from being long exposed in an air interface. Therefore, by means of the user equipment provided in this embodiment of the present disclosure, a risk of user privacy leakage can be reduced.

It may be clearly understood by a person skilled in the art that, for the purpose of convenient and brief description, for a detailed working process and description of the foregoing user equipment, refer to a corresponding process in the foregoing method embodiment, and details are not described herein again.

Embodiment 13

Figure 13:
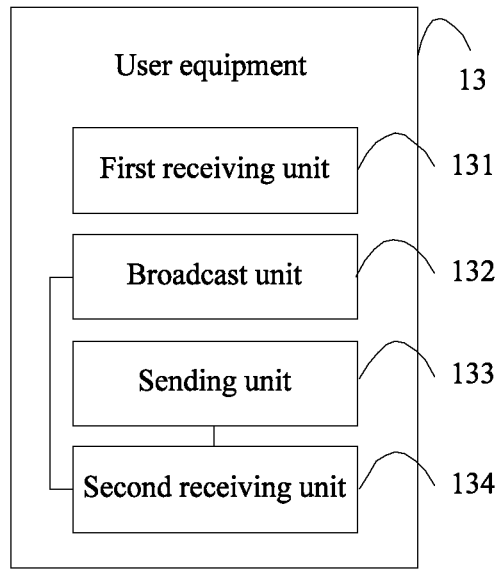
FIG. 13 is a schematic structural diagram of still another user equipment according to an embodiment of the present disclosure.

This embodiment of the present disclosure provides still another user equipment 13, configured to implement the method embodiment shown in FIG. 6. As shown in FIG. 13, the user equipment 13 includes:

a first receiving unit 131, configured to receive a first code word broadcast by first user equipment, where the first code word is a code word that is allocated by a first proximity-based service entity to the user equipment for broadcasting; and a broadcast unit 132, configured to broadcast a second code word after the receiving unit 131 receives the first code word, where the second code word is obtained by the user equipment from a second proximity-based service entity to which the user equipment belongs, where the first receiving unit 131 is further configured to receive location information of the first user equipment that is broadcast by the first user equipment within a preset time period after receiving the second code word by using a filter, where the filter uniquely corresponds to the second code word.

Specifically, before broadcasting the first code word, the first user equipment instructs the first proximity-based service entity to which the first user equipment belongs to configure the second code word and the filter that corresponds to the second code word, and receives the filter sent by the first proximity-based service entity.

Optionally, the user equipment 13 further includes:

a sending unit 133, configured to send a second discovery request message to the second proximity-based service entity, where the second discovery request message includes second indication information, and the second indication information is used to request the second code word from the second proximity-based service entity; and a second receiving unit 134, configured to receive a second discovery response message sent by the second proximity-based service entity, where the second discovery response message includes the second code word.

If the first user equipment and the user equipment belong to a same proximity-based service entity, after receiving the second discovery request message sent by the user equipment, the second proximity-based service entity sends the second discovery response message that includes the second code word to the user equipment. If the first user equipment and the user equipment belong to different proximity-based service entities, the second proximity-based service entity corresponding to the user equipment may send a listen request message to the first proximity-based service entity that corresponds to the first user equipment, to obtain the second code word in the first proximity-based service entity, and send the second code word to the user equipment.

It may be clearly understood by a person skilled in the art that, for the purpose of convenient and brief description, for a detailed working process and description of the foregoing user equipment, refer to a corresponding process in the foregoing method embodiment, and details are not described herein again.

By means of the foregoing user equipment, after receiving a first code word broadcast by the first user equipment, the user equipment begins to broadcast the second code word, and after receiving the second code word by using a corresponding filter, the first user equipment broadcasts location information of the first user equipment within a preset time period. The first user equipment broadcasts the location information only within the preset time period, thereby preventing the location information from being long exposed in an air interface, and reducing a risk of user privacy leakage.

Embodiment 14

Figure 14:
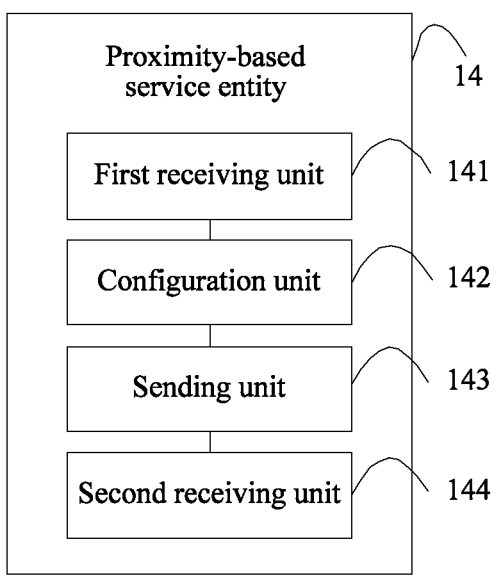
FIG. 14 is a schematic structural diagram of another proximity-based service entity according to an embodiment of the present disclosure.

This embodiment of the present disclosure provides another proximity-based service entity 14, configured to implement the method embodiment shown in FIG. 7. As shown in FIG. 14, the proximity-based service entity 14 includes:

a first receiving unit 141, configured to receive a first discovery request message sent by first user equipment, where the first discovery request message includes first indication information;

a configuration unit 142, adapted to configure, according to the first indication information, a second code word and a filter that corresponds to the second code word;

a sending unit 143, configured to send a first code word and the filter to the first user equipment; and a second receiving unit 144, configured to receive a second discovery request message sent by the second user equipment, where the second discovery request message includes second indication information, where the sending unit 143 is further configured to send the second code word to the second user equipment according to the second indication information, so that the first user equipment broadcasts location information of the first user equipment within a preset time period after receiving, according to the filter, the second code word broadcast by the second user equipment.

Specifically, after receiving the first code word broadcast by the first user equipment, the second user equipment begins to broadcast the second code word obtained from the proximity-based service entity. After receiving the second code word by using the corresponding filter, the first user equipment broadcasts the location information of the first user equipment within the preset time period, so that the second user equipment determines a location of the first user equipment according to the location information after receiving the location information.

It may be clearly understood by a person skilled in the art that, for the purpose of convenient and brief description, for a detailed working process and description of the foregoing proximity-based service entity, refer to a corresponding process in the foregoing method embodiment, and details are not described herein again.

By means of the foregoing proximity-based service entity, the proximity-based service entity allocates a second code word to second user equipment, and allocates a filter that corresponds to the second code word to the first user equipment, and after receiving the second code word by using the filter, the first user equipment broadcasts location information within a preset time period, thereby preventing the location information from being long exposed in an air interface, and reducing a risk of user privacy leakage.

Embodiment 15

Figure 15:
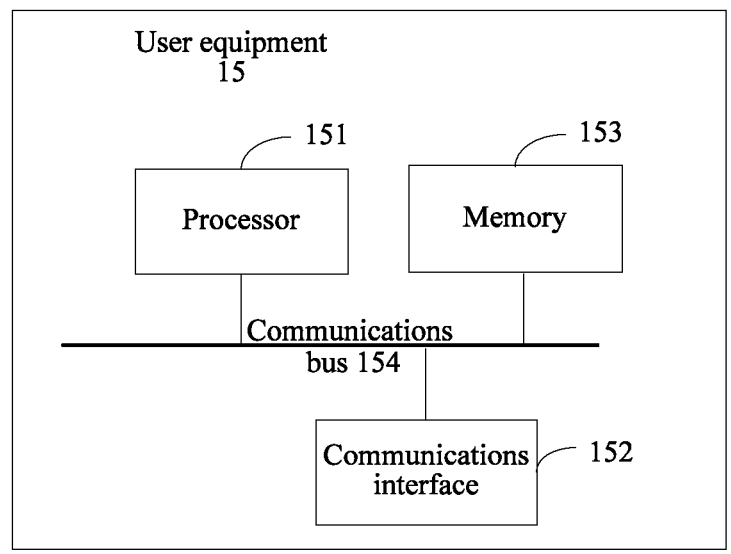
FIG. 15 is a schematic structural diagram of still another user equipment according to an embodiment of the present disclosure.

This embodiment of the present disclosure provides still another user equipment 15. As shown in FIG. 15, the user equipment 15 includes:

a processor (processor) 151, a communications interface (Communications Interface) 152, a memory (memory) 153, and a communications bus 154, where the processor 151, the communications interface 152, and the memory 153 communicate with each other by using the communications bus 154.

The processor 151 may be a multi-core central processing unit CPU or an application-specific integrated circuit ASIC (Application Specific Integrated Circuit), or is configured as one or more integrated circuits that implement this embodiment of the present disclosure.

The memory 153 is configured to save program code, where the program code includes a computer operation instruction and a network flow diagram. The memory 153 may include a high-speed RAM memory, and may further include a non-volatile memory (non-volatile memory), such as at least one magnetic disk memory. The memory 153 may also be a memory array. The memory 153 may also be partitioned into blocks, and the blocks may be combined into a virtual volume according to a particular rule.

The communications interface 152 is configured to implement connection and communication between these apparatuses.

The processor 151 is configured to execute the program code in the memory 153, to implement the following operations:

sending a discovery request message to a first proximity-based service entity, where the discovery request message includes initial location information of the user equipment;

receiving a discovery response message sent by the first proximity-based service entity, where the discovery response message includes a first code word of the user equipment;

obtaining location offset information of the user equipment, and generating a discovery message according to the location offset information and the first code word, where the location offset information is an offset between a current location and an initial location of the user equipment; and broadcasting the discovery message, where the discovery message is used by the second user equipment or a second proximity-based service entity to which the second user equipment belongs to determine a location of the user equipment according to the initial location information and the location offset information after obtaining the initial location information and the location offset information.

Optionally, the operations further include:

when the offset between the current location and the initial location of the user equipment is greater than a preset maximum offset, sending current location information of the user equipment to the first proximity-based service entity, so that the first proximity-based service entity updates the initial location information by using the current location information of the user equipment.

Embodiment 16

Figure 16:
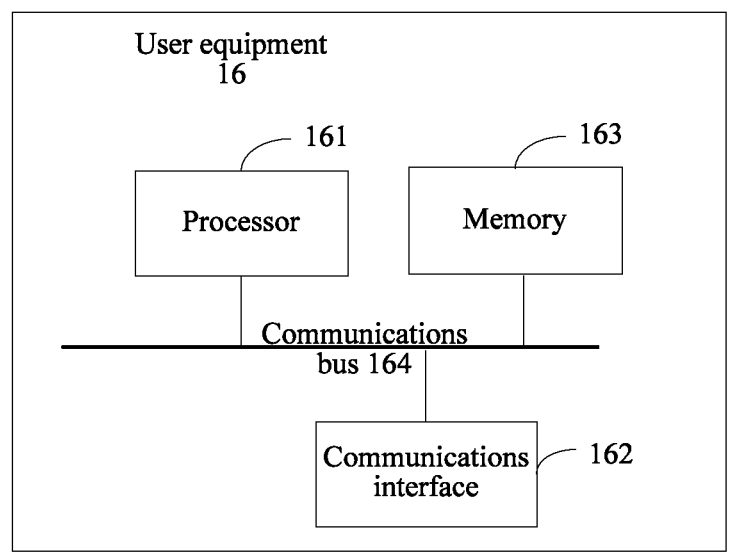
FIG. 16 is a schematic structural diagram of still another user equipment according to an embodiment of the present disclosure.

This embodiment of the present disclosure provides still another user equipment 16. As shown in FIG. 16, the user equipment 16 includes:

a processor (processor) 161, a communications interface (Communications Interface) 162, a memory (memory) 163, and a communications bus 164, where the processor 161, the communications interface 162, and the memory 163 communicate with each other by using the communications bus 164.

The processor 161 may be a multi-core central processing unit CPU or an application-specific integrated circuit ASIC (Application Specific Integrated Circuit), or is configured as one or more integrated circuits that implement this embodiment of the present disclosure.

The memory 163 is configured to save program code, where the program code includes a computer operation instruction and a network flow diagram. The memory 163 may include a high-speed RAM memory, and may further include a non-volatile memory (non-volatile memory), such as at least one magnetic disk memory. The memory 163 may also be a memory array. The memory 163 may also be partitioned into blocks, and the blocks may be combined into a virtual volume according to a particular rule.

The communications interface 162 is configured to implement connection and communication between these apparatuses.

The processor 161 is configured to execute the program code in the memory 163, to implement the following operations:

obtaining a discovery message broadcast by first user equipment, where the discovery message includes location offset information of the first user equipment, and the location offset information is an offset between a current location and an initial location of the first user equipment;

sending a match report message to a second proximity-based service entity to which the user equipment belongs, where the match report message includes the discovery message; and receiving initial location information of the first user equipment that is sent by the second proximity-based service entity, and determining a location of the first user equipment according to the initial location information and the location offset information; or receiving positioning information sent by the second proximity-based service entity, where the positioning information is used to indicate a location of the first user equipment, and the positioning information is obtained by the second proximity-based service entity according to the initial location information and the match report message.

Embodiment 17

Figure 17:
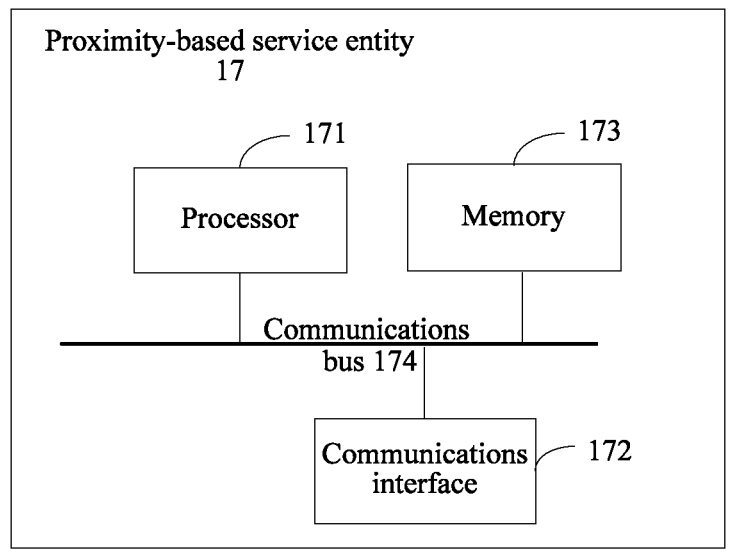
FIG. 17 is a schematic structural diagram of still another proximity-based service entity according to an embodiment of the present disclosure.

This embodiment of the present disclosure provides still another proximity-based service entity 17. As shown in FIG. 17, the proximity-based service entity 17 includes:

a processor (processor) 171, a communications interface (Communications Interface) 172, a memory (memory) 173, and a communications bus 174, where the processor 171, the communications interface 172, and the memory 173 communicate with each other by using the communications bus 174.

The processor 171 may be a multi-core central processing unit CPU or an application-specific integrated circuit ASIC (Application Specific Integrated Circuit), or is configured as one or more integrated circuits that implement this embodiment of the present disclosure.

The memory 173 is configured to save program code, where the program code includes a computer operation instruction and a network flow diagram. The memory 173 may include a high-speed RAM memory, and may further include a non-volatile memory (non-volatile memory), such as at least one magnetic disk memory. The memory 173 may also be a memory array. The memory 173 may also be partitioned into blocks, and the blocks may be combined into a virtual volume according to a particular rule.

The communications interface 172 is configured to implement connection and communication between these apparatuses.

The processor 171 is configured to execute the program code in the memory 173, to implement the following operations:

receiving a discovery request message sent by first user equipment, where the discovery request message includes initial location information of the first user equipment;

receiving a match report message sent by second user equipment, where the match report message includes a discovery message that is broadcast by the first user equipment, that is obtained by the second user equipment, and that includes location offset information of the first user equipment, where both the first user equipment and the second user equipment belong to the proximity-based service entity; and sending the initial location information to the second user equipment, so that the second user equipment determines a location of the first user equipment according to the initial location information and the location offset information; or obtaining positioning information according to the initial location information and the match report message, and sending the positioning information to the second user equipment, where the positioning information is used to indicate a location of the first user equipment.

Optionally, the operations further include:

determining the location of the first user equipment according to the initial location information and the location offset information, where the positioning information includes location information of the first user equipment.

Optionally, the match report message further includes location information of the second user equipment, and the operations further include:

determining the location of the first user equipment according to the initial location information and the location offset information; and determining a distance between the first user equipment and the second user equipment according to the location of the first user equipment and a location of the second user equipment, where the positioning information includes distance information between the first user equipment and the second user equipment.

Embodiment 18

Figure 18:
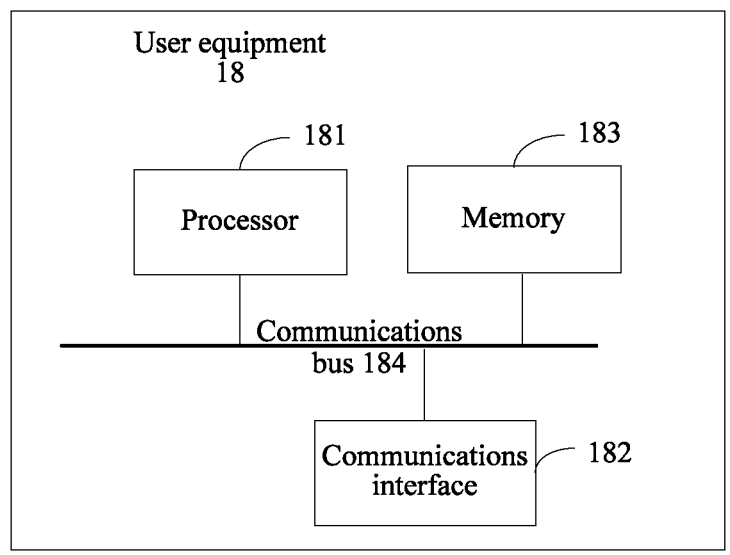
FIG. 18 is a schematic structural diagram of still another user equipment according to an embodiment of the present disclosure.

This embodiment of the present disclosure provides still another user equipment 18. As shown in FIG. 18, the user equipment 18 includes:

a processor (processor) 181, a communications interface (Communications Interface) 182, a memory (memory) 183, and a communications bus 184, where the processor 181, the communications interface 182, and the memory 183 communicate with each other by using the communications bus 184.

The processor 181 may be a multi-core central processing unit CPU or an application-specific integrated circuit ASIC (Application Specific Integrated Circuit), or is configured as one or more integrated circuits that implement this embodiment of the present disclosure.

The memory 183 is configured to save program code, where the program code includes a computer operation instruction and a network flow diagram. The memory 183 may include a high-speed RAM memory, and may further include a non-volatile memory (non-volatile memory), such as at least one magnetic disk memory. The memory 183 may also be a memory array. The memory 183 may also be partitioned into blocks, and the blocks may be combined into a virtual volume according to a particular rule.

The communications interface 182 is configured to implement connection and communication between these apparatuses.

The processor 181 is configured to execute the program code in the memory 183, to implement the following operations:

obtaining a first code word and a filter that corresponds to a second code word from a first proximity-based service entity to which the user equipment belongs;

broadcasting, by the user equipment, the first code word; and obtaining, by using the filter, the second code word that is broadcast by second user equipment after receiving the first code word, and broadcasting location information of the user equipment according to the second code word within a preset time period.

Optionally, the operations further include:

sending a first discovery request message to the first proximity-based service entity, where the first discovery request message includes first indication information, and the first indication information is used to instruct the first proximity-based service entity to configure the second code word and the filter that corresponds to the second code word; and receiving a first discovery response message sent by the first proximity-based service entity, where the first discovery response message includes the first code word and the filter.

Embodiment 19

Figure 19:
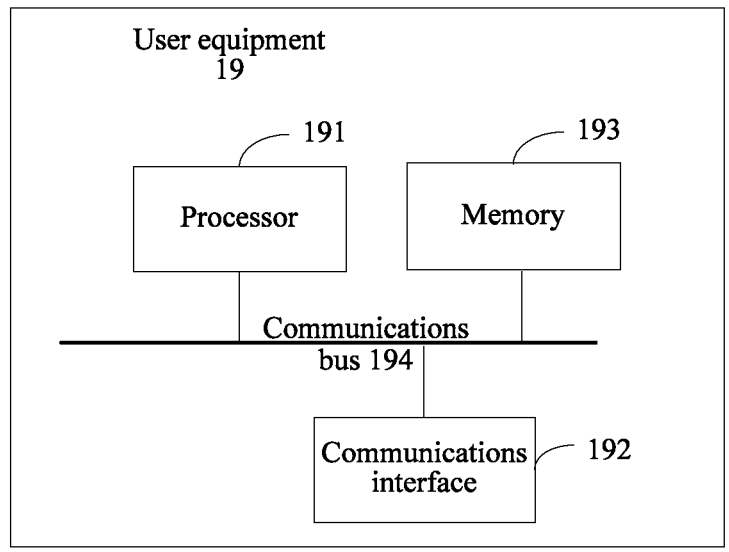
FIG. 19 is a schematic structural diagram of still another user equipment according to an embodiment of the present disclosure.

This embodiment of the present disclosure provides still another user equipment 19. As shown in FIG. 19, the user equipment 19 includes:

a processor (processor) 191, a communications interface (Communications Interface) 192, a memory (memory) 193, and a communications bus 194, where the processor 191, the communications interface 192, and the memory 193 communicate with each other by using the communications bus 194.

The processor 191 may be a multi-core central processing unit CPU or an application-specific integrated circuit ASIC (Application Specific Integrated Circuit), or is configured as one or more integrated circuits that implement this embodiment of the present disclosure.

The memory 193 is configured to save program code, where the program code includes a computer operation instruction and a network flow diagram. The memory 193 may include a high-speed RAM memory, and may further include a non-volatile memory (non-volatile memory), such as at least one magnetic disk memory. The memory 193 may also be a memory array. The memory 193 may also be partitioned into blocks, and the blocks may be combined into a virtual volume according to a particular rule.

The communications interface 192 is configured to implement connection and communication between these apparatuses.

The processor 191 is configured to execute the program code in the memory 193, to implement the following operations:

receiving a first code word broadcast by first user equipment;

broadcasting a second code word after the first code word is received, where the second code word is obtained by the user equipment from a second proximity-based service entity to which the user equipment belongs; and receiving location information of the first user equipment that is broadcast by the first user equipment within a preset time period after receiving the second code word by using a filter, where the filter uniquely corresponds to the second code word.

Optionally, the operations further include:

sending a second discovery request message to the second proximity-based service entity, where the second discovery request message includes second indication information, and the second indication information is used to request the second code word from the second proximity-based service entity; and receiving a second discovery response message sent by the second proximity-based service entity, where the second discovery response message includes the second code word.

Embodiment 20

Figure 20:
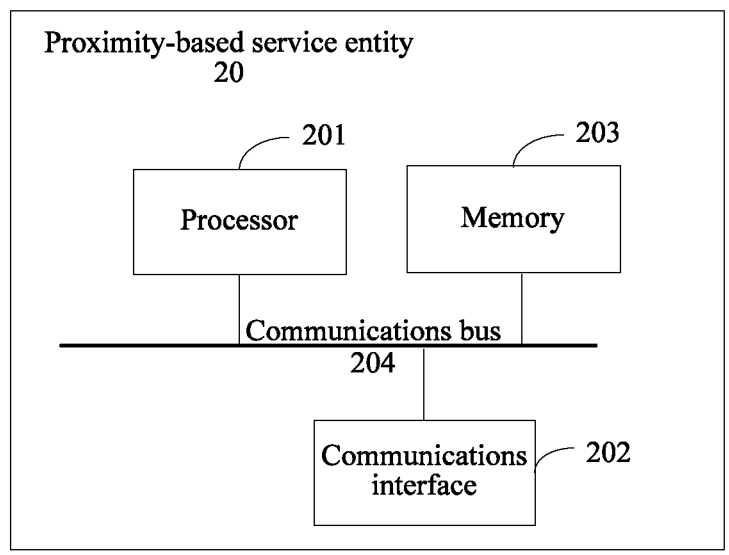
FIG. 20 is a schematic structural diagram of still another proximity-based service entity according to an embodiment of the present disclosure.
Figure 21:
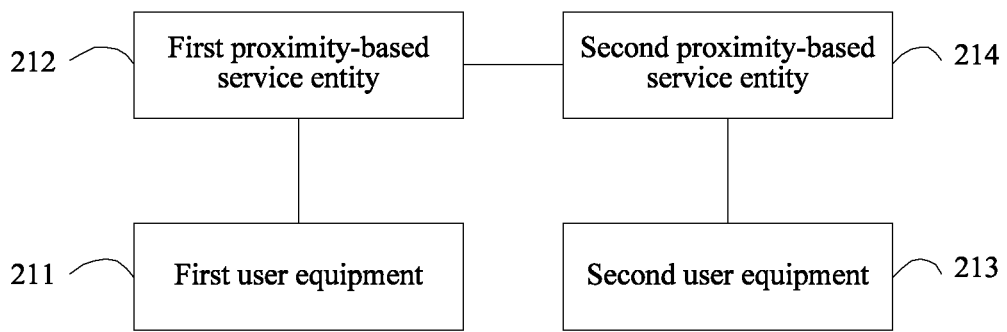
FIG. 21 is a schematic structural diagram of a communications system according to an embodiment of the present disclosure.

This embodiment of the present disclosure provides still another proximity-based service entity 20. As shown in FIG. 20, the proximity-based service entity 20 includes:

a processor (processor) 201, a communications interface (Communications Interface) 202, a memory (memory) 203, and a communications bus 204, where the processor 201, the communications interface 202, and the memory 203 communicate with each other by using the communications bus 204.

The processor 201 may be a multi-core central processing unit CPU or an application-specific integrated circuit ASIC (Application Specific Integrated Circuit), or is configured as one or more integrated circuits that implement this embodiment of the present disclosure.

The memory 203 is configured to save program code, where the program code includes a computer operation instruction and a network flow diagram. The memory 203 may include a high-speed RAM memory, and may further include a non-volatile memory (non-volatile memory), such as at least one magnetic disk memory. The memory 203 may also be a memory array. The memory 203 may also be partitioned into blocks, and the blocks may be combined into a virtual volume according to a particular rule.

The communications interface 202 is configured to implement connection and communication between these apparatuses.

The processor 201 is configured to execute the program code in the memory 203, to implement the following operations:

receiving a first discovery request message sent by first user equipment, where the first discovery request message includes first indication information;

configuring, according to the first indication information, a second code word and a filter that corresponds to the second code word;

sending a first code word and the filter to the first user equipment; and receiving a second discovery request message sent by the second user equipment, where the second discovery request message includes second indication information, and sending the second code word to the second user equipment according to the second indication information, so that the first user equipment broadcasts location information of the first user equipment within a preset time period after receiving, according to the filter, the second code word broadcast by the second user equipment.

Embodiment 21

This embodiment of the present disclosure provides a communications system, including first user equipment 211, a first proximity-based service entity 212 to which the first user equipment 211 belongs, second user equipment 213, and a second proximity-based service entity 214 to which the second user equipment 213 belongs, where the first proximity-based service entity 212 is connected to the second proximity-based service entity 214.

The first user equipment 211 is the user equipment 90o shown in FIG. 9 or the user equipment 15 shown in FIG. 15.

For details, refer to descriptions in the embodiment corresponding to FIG. 9 or FIG. 15, and the details are not described herein again.

The second user equipment 213 is the user equipment 10 shown in FIG. 10 or the user equipment 16 shown in FIG. 16. For details, refer to descriptions in the embodiment corresponding to FIG. 10 or FIG. 16, and the details are not described herein again.

By means of the foregoing communications system, because a discovery message broadcast by first user equipment carries location offset information, another user equipment cannot determine a location of the first user equipment only according to the location offset information, but the second user equipment or the second proximity-based service entity may determine the location of the first user equipment according to the location offset information and initial location information of the first user equipment, thereby preventing the location of the user equipment from being exposed, and resolving a problem of user privacy leakage.

Embodiment 22

Figure 22:
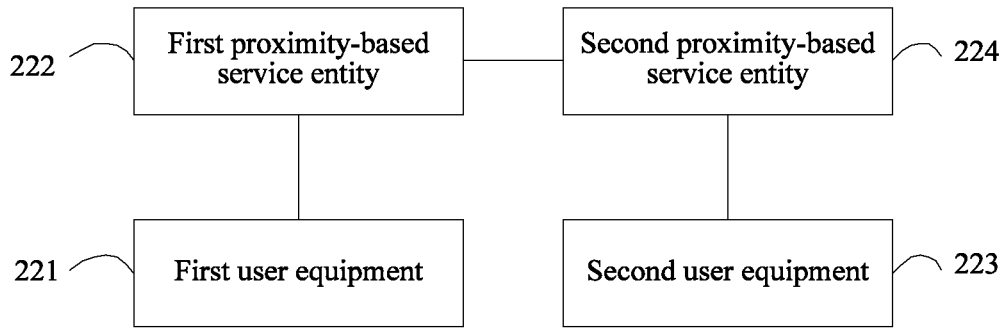
FIG. 22 is a schematic structural diagram of another communications system according to an embodiment of the present disclosure.

This embodiment of the present disclosure provides another communications system. As shown in FIG. 22, the communications system includes first user equipment 221, a first proximity-based service entity 222 to which the first user equipment 221 belongs, second user equipment 223, and a second proximity-based service entity 224 to which the second user equipment 223 belongs, where the first proximity-based service entity 222 is connected to the second proximity-based service entity 224.

The first user equipment 221 is the user equipment 12 shown in FIG. 12 or the user equipment 18 shown in FIG. 18. For details, refer to descriptions in the embodiment corresponding to FIG. 12 or FIG. 18, and the details are not described herein again.

The second user equipment 223 is the user equipment 13 shown in FIG. 13 or the user equipment 19 shown in FIG. 19. For details, refer to descriptions in the embodiment corresponding to FIG. 13 or FIG. 19, and the details are not described herein again.

By means of the foregoing communications system, the first proximity-based service entity in the communications system allocates a second code word to the second user equipment, and allocates a filter that corresponds to the second code word to the first user equipment, and after receiving the second code word by using the filter, the first user equipment broadcasts location information within a preset time period, thereby preventing the location information from being long exposed in an air interface, and reducing a risk of user privacy leakage.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be saved in a computer-readable storage medium. The software functional unit is saved in a storage medium and includes several instructions for instructing a computer device (which may be a personal computer, a server, or a network device) to perform some of the steps of the methods described in the embodiments of the present disclosure. The foregoing storage medium includes: any medium that can save program code, such as a USB flash drive, a removable hard disk, a read-only memory (full spelling in English: Read-Only Memory, ROM), a random access memory (full spelling in English: Random Access Memory, RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A discovery method comprising:
    sending, by first user equipment, a discovery request message to a first proximity-based service entity, wherein the discovery request message comprises initial location information of the first user equipment;
    receiving a discovery response message sent by the first proximity-based service entity, wherein the discovery response message comprises a first code word of the first user equipment;
    obtaining location offset information of the first user equipment;
    generating a discovery message according to the location offset information and the first code word, wherein the location offset information is an offset between a current location and an initial location of the first user equipment; and
    broadcasting the discovery message, wherein the discovery message is used by a second user equipment to determine a location of the first user equipment according to the initial location information and the location offset information after obtaining the initial location information and the location offset information.

2. The method according to claim 1, further comprising sending current location information of the first user equipment to the first proximity-based service entity, when the offset between the current location and the initial location of the first user equipment is greater than a preset maximum offset, so that the first proximity-based service entity updates the initial location information by using the current location information of the first user equipment.

3. A discovery method comprising:
receiving, by a first proximity-based service entity, a discovery request message sent by first user equipment, wherein the discovery request message comprises initial location information of the first user equipment;
receiving a match report message sent by second user equipment, wherein the match report message comprises a discovery message that is broadcast by the first user equipment, that is obtained by the second user equipment, and that comprises location offset information of the first user equipment, wherein both the first user equipment and the second user equipment belong to the first proximity-based service entity; and
sending the initial location information to the second user equipment, so that the second user equipment determines a location of the first user equipment according to the initial location information and the location offset information; or
obtaining positioning information according to the initial location information and the match report message; and
sending the positioning information to the second user equipment, wherein the positioning information is used to indicate a location of the first user equipment.

4. The method according to claim 3, wherein obtaining positioning information according to the initial location information and the match report message comprises determining the location of the first user equipment according to the initial location information and the location offset information, and wherein the positioning information comprises location information of the first user equipment.

5. The method according to claim 3, wherein match report message further comprises location information of the second user equipment, wherein obtaining positioning information according to the initial location information and the match report message comprises determining the location of the first user equipment according to the initial location information and the location offset information and determining a distance between the first user equipment and the second user equipment according to the location of the first user equipment and a location of the second user equipment, and wherein the positioning information comprises distance information between the first user equipment and the second user equipment.

6. A user equipment comprising:
a processor; and
a non-transitory computer readable storage medium storing programming for execution by the processor, the programming including instructions to:
send a discovery request message to a first proximity-based service entity, wherein the discovery request message comprises initial location information of the user equipment;
receive a discovery response message sent by the first proximity-based service entity, wherein the discovery response message comprises a first code word of the user equipment;
obtain location offset information of the user equipment, and generate a discovery message according to the location offset information and the first code word, wherein the location offset information is an offset between a current location and an initial location of the user equipment; and
broadcast the discovery message, wherein the discovery message is used by a second user equipment to determine a location of the user equipment according to the initial location information and the location offset information after obtaining the initial location information and the location offset information.

7. The user equipment according to claim 6, further comprising the instructions to send current location information of the user equipment to the first proximity-based service entity, when the offset between the current location and the initial location of the user equipment is greater than a preset maximum offset, so that the first proximity-based service entity updates the initial location information by using the current location information of the user equipment.

* * * * *